(12) United States Patent
Moriichi et al.

(10) Patent No.: US 7,787,344 B2
(45) Date of Patent: Aug. 31, 2010

(54) WRITING DEVICE

(75) Inventors: Munetoshi Moriichi, Kanagawa (JP);
Mitsuyuki Bamba, Saitama (JP);
Takashi Sasaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 2517 days.

(21) Appl. No.: 09/761,961

(22) Filed: Jan. 17, 2001

(65) Prior Publication Data
US 2001/0028618 A1 Oct. 11, 2001

(30) Foreign Application Priority Data
Jan. 24, 2000 (JP) ............................ P2000-017889

(51) Int. Cl.
*G11B 20/10* (2006.01)
(52) U.S. Cl. ............... 369/59.12; 369/47.51; 369/53.26
(58) Field of Classification Search ....................... None
See application file for complete search history.

(56) References Cited

U.S. PATENT DOCUMENTS

| 5,103,441 A | 4/1992 | Yokogawa | |
| 6,657,936 B2 * | 12/2003 | Harvey et al. | 369/59.12 |
| 2003/0107967 A1 * | 6/2003 | Harvey et al. | 369/59.12 |

\* cited by examiner

*Primary Examiner*—Paul Huber
(74) *Attorney, Agent, or Firm*—Oblon, Spivak, McClelland, Maier & Neustadt, L.L.P.

(57) ABSTRACT

In a writing device for writing data at 1-time or higher recording rates, a first delay circuit capable of variably controlling a delay time in units of a relatively long time and a second delay circuit capable of variably controlling a delay time in units of a relatively short time are employed in a combined manner. A laser drive pulse can be controlled in the direction of the time base with high accuracy corresponding to any recording rates ranging from 1-time to higher, e.g., 8- or 12-time, speeds without using very large number stages of delay gates.

9 Claims, 15 Drawing Sheets

WRITING DEVICE

BACKGROUND OF THE INVENTION

1. Field of the Invention

The present invention relates to a writing device for writing, on a recording medium, record data using a beam of laser light modulated in accordance with the record data (i.e., based on optical modulation recording).

2. Description of the Related Art

When data is written on a recording medium, such as an optical disk, based on optical modulation recording, laser light is usually emitted in the form of pulses to carry out thermal control for satisfactory shaping of pits (marks) formed on the disk.

More specifically, a laser irradiation period is controlled by setting a pulse waveform to be suitable as a laser driver pulse for driving a laser, and controlling each pulse duration in the direction of the time base.

As data writable disk media, there are known write-once disks such as CD-R (CD-Recordable=CD-WO) and rewritable disks such as CD-RW (CD-Rewritable). In these CD disks such as CD-R and CD-RW, it has been customary that an EFM signal is created as record data and a laser drive pulse is formed in accordance with the EFM signal.

A pulse width of the EFM signal is specified so as to fall in the range of 3T-11T. "T" corresponds to one clock period at the EFM frequency.

When writing data in CD-R based on changes of a dye film, for example, laser drive pulses shown in FIG. 14(b) are created depending on lengths of pits and lands to be recorded, as shown in FIG. 14(a), and a laser is driven by the laser drive pulses to emit light. Additionally, a level PWr in the drawing corresponds to a laser recording power.

In some CD-Rs, step-shaped laser drive pulses shown in FIG. 14(d) are created by combining two kinds of pulses shown in FIGS. 14(b) and 14(c) with each other. With this method, the laser power is increased up to a level PWod, for example, in part of duration of a pulse for producing a pit. Such a part of the pulse duration is also called an overdrive pulse. Addition of an overdrive pulse enables a laser light level to be more finely controlled within the pulse duration.

When writing data in CD-RW by the phase change recording method, a laser is driven by generating laser drive pulses, called a pulse train, having a laser power level repeatedly changed between recording power Wr and cooling power PWc within a pit forming zone, as shown in FIG. 14(e). In a land period, the laser power has a level of erasure power PWe.

The above-mentioned control of laser drive pulses for CD-R and CD-RE in the direction of the time base is effected by controlling each pulse waveform at its rising and falling edges, for example, indicated by o in FIGS. 14(b) to 14(e).

In other words, as shown in FIG. 15, the rising and falling edges of each pulse waveform are controlled with delay processing DL such that the phase advances or retreats.

The reason why a pulse waveform is controlled in the direction of the time base is as follows.

In a write-once disk such as CD-R, for example, as a pit to be recorded becomes longer, it is required to increase the laser recording power relative to the reading power for a longer period of time. Therefore, a larger amount of heat is accumulated in a recording layer, and an area subjected to chemical changes is enlarged, whereby a pit actually recorded tends to have a greater length than the prescribed one. This tendency is inevitably more significant as a recording layer of the disk has higher heat sensitivity or higher heat conductivity.

Further, the length over which a pit going to be now recorded is actually formed also depends on the length of a land just before the pit. Stated otherwise, the smaller the length of a land just before the pit, the less is radiated heat accumulated during recording of a preceding pit and the more significantly is affected the relevant pit by thermal interference.

For example, even when a pit going to be recorded has the same length and a beam of laser light is irradiated with the same power to record the pit for the same period of time, the pit actually formed tends to have a greater length as a land just before the relevant pit has a smaller length.

In view of the above-described situations, to cope with the former problem, a laser drive pulse is controlled in the direction of the time base such that the laser drive pulse has an optimum length depending on the length of a pit going to be recorded (i.e., the pit length in the range of 3T-11T). To cope with the latter problem, a laser drive pulse is controlled in the direction of the time base such that the laser drive pulse has an optimum length depending on the length of a land just before the pit going to be recorded. To cope with a combination of the former and latter problems, a laser drive pulse is controlled in the direction of the time base depending on combination of both the length of a pit going to be recorded and the length of a land just before the pit.

The control of a laser drive pulse in the direction of the time base is carried out by delay processing utilizing a PLL clock in sync with a signal to be recorded, or delay processing using a delay line.

FIG. 16 shows one example of a delay circuit using a delay line. The delay circuit comprises, for example, five stages of delay gates 101-105 and a selector 100.

In this delay circuit, a required delay time can be obtained by the selector 100 selecting one tap in accordance with a control signal (not shown). Assuming, for example, that one delay gate has a delay time of 5 nsec, a total delay time can be changed over in units of 5 nsec within the range of 0-25 nsec. Thus, an appropriate length of the laser drive pulse can be realized by changing a tap selected by the selector 100 depending on the length of a pit going to be recorded or the length of a land just before the pit.

FIG. 17 shows one example of a delay circuit for delaying a pulse by a shift register 110 using a PLL clock CL. Assuming, for example, that the frequency of a PLL clock is 200 MHz, a time period of one clock is about 5 nsec and therefore delay processing can be performed in units of 5 nsec. If the frequency of a PLL clock is 400 MHz, delay processing can be performed in units of 2.5 nsec.

With a recent increase in writing rate, data has become written on CD-R and CD-RW at 2- and 4-times speeds rather than a conventional rate (1-time speed). A further increase in writing rate up to 8-time, 12-times or more speeds is now under the progress.

Considering the above-mentioned control of a laser drive pulse in the direction of the time base in relation to a writing rate, control of a delay time in units of 5 nsec, for example, is satisfactory for writing at a 1-time speed. However, when such control is applied to writing at a 4-, 8- or 12-time speed, the accuracy of a delay time becomes insufficient and the laser drive pulse cannot be controlled in the direction of the time base with high accuracy.

Writing at an 8-time speed, for example, requires a delay time to be controlled in units of at least 2.5 nsec. Also, in consideration of writing at a 12-time speed, control of a delay time in units of 1 or less nsec is demanded.

In trying to perform control of a delay time in units of 0.5 nsec by using the delay line shown in FIG. 16, for example, the control can be realized by employing delay gates each of which has a delay time of 0.5 nsec.

Also, in the case of employing the delay circuit utilizing a PLL clock shown in FIG. 17, for example, the control can be realized by increasing the frequency of the PLL clock.

However, increasing the PLL clock frequency up to a sufficient level is difficult to implement in practice. It is therefore more realistic to employ a delay line.

There is however another situation that even writing devices adapted for 8- and 12-time speeds are practically required to support once-speed writing as well.

Assuming that control of a delay time variable in the range of 0-25 nsec is required for once-speed writing, 50 stages of delay lines are needed in the case of employing a delay line in which a delay time is variable in units of 0.5 nsec. Of course, a larger number of gate stages are necessary when a unit of a variable delay time, i.e., a delay time of one gate stage, is set to a smaller value, or when variations in delay time of each gate stage is taken into consideration.

In other words, control of a laser drive pulse in the direction of the time base can be relatively easily realized with high accuracy in a manner adapted for high-rate writing by employing a delay line. However, trying to support once-speed writing as well by the same delay line gives rise to a problem of a difficulty in realizing such a delay line because a very large number of gate stages are required.

Another problem is that, since a delay line is generally susceptible to large variations in device accuracy, e.g., in delay time depending on temperatures, it is hard in the delay line to realize control of a laser drive pulse in the direction of the time base with high accuracy.

SUMMARY OF THE INVENTION

In view of the state of the art set forth above, it is an object of the present invention to provide a writing device for writing data at 1-time or higher recording rates, which can appropriately control a laser drive pulse in the direction of the time base with high accuracy.

To achieve the above object, a writing device according to the present invention comprises a laser unit for irradiating a beam of laser light with a laser drive pulse supplied to the laser unit and forming, on a recording medium, a train of record data in the form of pits and lands between the pits; a laser drive pulse generating unit for generating a laser drive pulse corresponding to the record data; and a waveform adjusting unit including a first delay circuit for delaying the laser drive pulse using a high-frequency clock in sync with the laser drive pulse to provide a delay time in units of the high-frequency clock, a second delay circuit for delaying the laser drive pulse using multistage delay gates to provide a delay time shorter than the delay time provided by the first delay circuit, and a delay time control unit for variably controlling the delay time of the first delay circuit and the delay time of the second delay circuit, the waveform adjusting unit delaying the whole or part of a waveform of the laser drive pulse generated by the laser drive pulse generating unit and supplying, to the laser unit, the laser drive pulse having been adjusted in the direction of the time base.

Thus, the first delay circuit capable of variably controlling a delay time in units of a relatively long time and the second delay circuit capable of variably controlling a delay time in units of a relatively short time are employed in a combined manner. Therefore, the laser drive pulse can be controlled in the direction of the time base with high accuracy corresponding to any recording rates ranging from 1-time to higher, e.g., 8- or 12-time, speeds without using very large number stages of delay gates.

Preferably, the delay time control unit of the waveform adjusting unit sets the delay time of the first delay circuit and the delay time of the second delay circuit depending on a length of a pit going to be recorded on the recording medium and a length of a land just before the pit.

With that feature, the length of each pit going to be recorded can be controlled to an appropriate one in consideration of heat accumulation and thermal conductivity of a recording layer.

Preferably, the waveform adjusting unit includes a plurality of delay sections each comprising the first delay circuit and the second delay circuit, a plurality of pulses are created from the laser drive pulse generated by the laser drive pulse generating unit and are supplied to the delay sections, respectively, and outputs from the delay sections are synthesized to form a laser drive pulse supplied to the laser unit.

With those features, delay control of a laser drive pulse can be performed individually at a plurality of points such as rising and falling points of the pulse. Therefore, a laser drive pulse having a more appropriate waveform can be formed.

Preferably, the first delay circuit and the second delay circuit are situated in one IC chip. With this feature, a circuit configuration can be simplified and variations in characteristics of the delay gates of the second delay circuit can be regarded as being the same. In other words, even when a plurality of second delay circuits are provided, the second delay circuits can be assumed to have substantially the same characteristics, and variations in characteristics of the delay gates can be more easily coped with.

Preferably, the writing device further comprises a measuring unit for measuring characteristics of the multistage delay gates in the second delay circuit. With this feature, delay control of the second delay circuit can be performed in consideration of the characteristics of the multistage delay gates.

Preferably, the delay time control unit controls the delay time of the second delay circuit using information obtained from a measurement result of the measuring unit. With this feature, it is possible to absorb variations in the characteristics of the multistage delay gates and achieve highly accurate control of the delay time.

DESCRIPTION OF THE PREFERRED EMBODIMENTS

A disk drive (writing and reproducing device) adapted for CD-R and CD-RW will be described below as one embodiment of the present invention.

The description is made in the order listed below.
1. Configuration of Disk Drive
2. Configuration of Write Strategy Unit and Delay Processing
3. Configuration of Measuring Circuit and Measurement Processing

1. Configuration of Disk Drive

CD-R is a write-once disk medium employing an organic dye in a recording layer, and CD-RW is a disk medium in which data is rewritable using the phase change technology.

The configuration of a disk drive according to this embodiment, which enables data to be written on and reproduced from disks such as CD-R and CD-RW, will be described with reference to FIG. 1.

Figure 1:
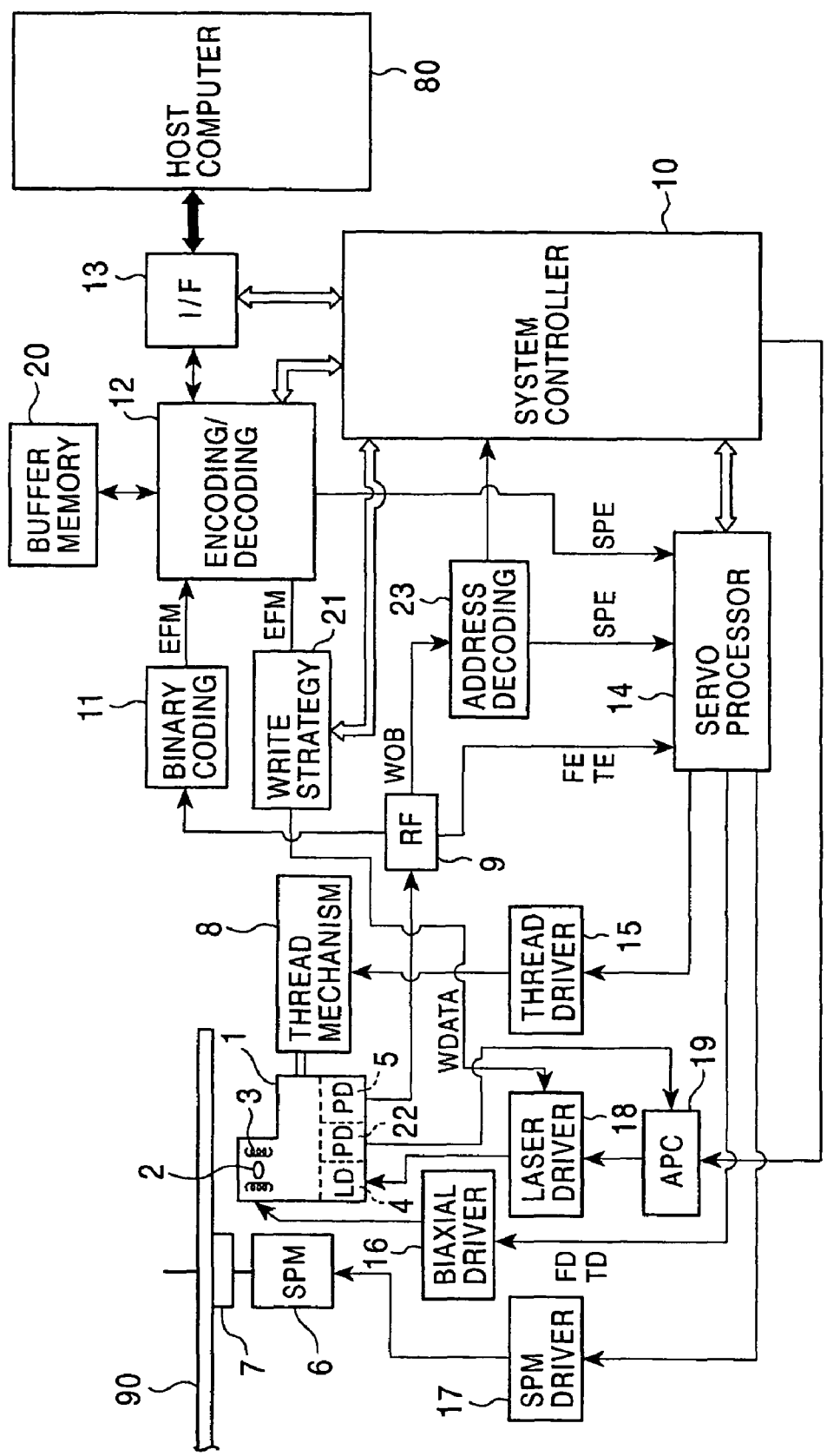
FIG. 1 is a block diagram of a disk drive according to an embodiment of the present invention.

In FIG. 1, a disk 90 is CD-R or CD-RW. The disk drive can also reproduce data from CD-DA, CD-ROM, etc. as other examples of the disk 90 used herein.

The disk 90 is placed on a turntable 7 and is driven by a spindle motor 1 for rotation at a constant linear velocity (CLV) or constant angular velocity (CAV) during the writing and reproducing operation. Pit data (i.e., data in the form of pits based on phase changes or changes of an organic dye (reflectance changes)) on the disk 90 is read by an optical pickup 1. Note that, in CD-DA, CD-ROM, etc., a "pit" means an embossed pit.

The pickup 1 includes a laser diode 4 serving as a laser light source, a photodetector 5 for detecting reflected light, an objective lens 2 serving as an output end for laser light, and an optical system (not shown) for irradiating the laser light to a recording surface of the disk 90 through the objective lens 2 and introducing light reflected by the recording surface to the photodetector 5.

Another photodetector 22 for monitoring is also provided to receive part of the output light from the laser diode 4.

The objective lens 2 is supported by a biaxial mechanism 3 for movement in both the tracking direction and the focusing direction.

The pickup 1 is entirely movable by a thread mechanism 8 in the radial direction of the disk.

Further, the laser diode 4 in the pickup 1 is driven to emit a beam of laser light in accordance with a drive signal (drive current) from a laser driver 18.

Information of the reflected light from the disk 90 is detected by the photodetector 5 and is supplied to an RF amplifier 9 after being converted into an electrical signal corresponding to the intensity of received light.

The RF amplifier 9 comprises current-to-voltage converting circuits, matrix computation and amplification circuits, etc. in a one-to-one relation to output currents from a plurality of light receiving devices which constitute the photodetector 5, and creates signals necessary for executing matrix computation processing. Signals created by the RM amplifier 9 are, for example, an RF signal as reproduced data, a focusing error signal FE for servo control, and a tracking error signal TE.

The reproduced RF signal outputted from the RF amplifier 9 is supplied to a binary coding circuit 11, while the focusing error signal FE and the tracking error signal TE are supplied to a servo processor 14.

In the disk 90 such as CD-R or CD-RW, a groove serving as a guide for a recording track is formed beforehand, and the groove is wobbled in accordance with a signal obtained by FM-modulating time information that represents an absolute address on the disk. In the writing operation, therefore, tracking servo control can be performed based on the groove information, and an absolute address can be acquired based on the wobble information obtained from the groove. The RF amplifier 9 extracts wobble information WOB through the matrix computation processing and supplies the extracted wobble information WOB to an address decoder 23.

The address decoder 23 demodulates the supplied wobble information WOB to obtain absolute address information, and supplies the absolute address information to a system controller 10.

Further, the groove information is supplied to a PLL circuit to acquire information about a rotational speed of the spindle motor 6, and this rotational speed information is compared with reference speed information to create and output a spindle error signal SPE.

The reproduced RF signal obtained by the RF amplifier 9 is binary-coded by the binary coding circuit 11 into a so-called EFM (8-14 modulation) signal, which is supplied to an encoding/decoding unit 12.

The encoding/decoding unit 12 comprises a section functioning as a decoder in the reproducing operation, and a section functioning as an encoder in the writing operation.

In the reproducing operation, the encoding/decoding unit 12 executes decoding processing, e.g., EFM demodulation, CIRC error correction, deinterleaving, and CD-ROM decoding, thereby obtaining reproduced data that has been converted into CD-ROM format data.

Also, the encoding/decoding unit 12 executes processing to extract sub-codes from the data read out of the disk 90, and supplies TOC, address information, etc., which are contained in the extracted sub-codes (Q data), to the system controller 10.

Further, the encoding/decoding unit 12 executes PLL processing to generate a reproduced clock in sync with the EFM signal, and then executes the above-described decoding processing in accordance with the reproduced clock. In this connection, information about a rotational speed of the spindle motor 6 is obtained from the reproduced clock and is compared with the reference speed information to create and output the spindle error signal SPE.

During the reproducing operation, the encoding/decoding unit 12 accumulates the data, which has been decoded as described above, in a buffer memory 20.

The data buffered in the buffer memory 20 is read and transferred as a reproduced output from the disk drive.

An interface (I/F) 13 is connected to an external host computer 80 to perform communication of record data, reproduced data, various commands, etc. between the disk drive and the host computer 80. In practice, the interface 13 comprises an SCSI or ATAPI interface. In the reproducing operation, the reproduced data having been decoded and stored in the buffer memory 20 is outputted and transferred from the disk drive to the interface 13.

Various signals from the host computer 80, such as a read command and a write command, are supplied to the system controller 10 through the interface 13.

On the other hand, in the writing operation, record data (such as audio data and CD-ROM data) is transferred from the host computer 80 to the interface 13, from which the record data is supplied to the buffer memory 20 and buffered therein.

In this connection, the encoding/decoding unit 12 executes encoding processing of the buffered record data, such as processing to encode CD-ROM format data into CD format data (when the supplied data is CD-ROM data), encoding and interleaving of CIRC, addition of sub-codes, and EFM modulation.

An EFM signal resulting from the encoding processing executed by the encoding/decoding unit 12 is subjected to waveform adjustment processing in a write strategy unit 21, and thereafter sent as laser drive pulses (write data WDATA) to a laser driver 18.

Although the configuration and operation of the write strategy unit 21 will be described later in detail, the write strategy unit 21 executes delay processing to realize adjustment of the EFM signal, i.e., laser drive pulses before the waveform adjustment, in this embodiment.

The laser driver 18 applies the laser drive pulses, which have been supplied as the write data WDATA, to the laser diode 4 for driving it to emit beams of laser light. With the emitted beams of laser light, pits (such as phase change pits or dye change pits) corresponding to the EFM signal are formed on the disk 90.

An APC (Auto Power Control) circuit 19 is a circuit for controlling a laser output power to be kept constant regardless of temperatures, etc. while monitoring the laser output power based on an output of the photodetector 22 for monitoring. A target value of the laser output power is applied from the system controller 10, and the laser driver 18 is controlled so that a level of the laser output power is held at the target value.

The servo processor 14 creates various servo drive signals for the focusing, tracking, thread, and spindle drivers based on, e.g., the focusing error signal FE and the tracking error signal TE from the RF amplifier 9, as well as the spindle error signal SPE from the encoding/decoding unit 12 or the address decoder 20, for thereby executing servo operations.

More specifically, a focusing drive signal FD and a tracking drive signal TD are created corresponding to the focusing error signal FE and the tracking error signal TE, respectively, and are supplied to a biaxial driver 16. The biaxial driver 16 energizes a focusing coil and a tracking coil of the biaxial mechanism 3 in the pickup 1. Thus, a tracking servo loop and a focusing servo loop are formed by the pickup 1, the RF amplifier 9, the servo processor 14, the biaxial driver 16, and the biaxial mechanism 3.

Also, in response to a track jump command from the system controller 10, the tracking servo loop is turned off and a jump drive signal is outputted to the biaxial driver 16, whereby a track jump operation is executed.

Further, the servo processor 14 creates a spindle drive signal corresponding to the spindle error signal SPE and supplies the spindle drive signal to the spindle motor driver 17. The spindle motor driver 17 applies, for example, a 3-phase drive signal corresponding to the spindle drive signal, thereby causing the spindle motor 6 to rotate at the CLV or CAV. In addition, the servo processor 14 creates a spindle drive signal corresponding to a spindle kick/brake control signal supplied from the system controller 10, thereby causing the spindle motor driver 17 to execute various operations of the spindle motor 6, such as startup, stop, speedup and slowdown.

Moreover, the servo processor 14 creates a thread drive signal based on a thread error signal that is obtained as a low-range component of, e.g., the tracking error signal TE, access execution control made by the system controller 10, etc., and then supplies the thread drive signal to the thread driver 15. The thread driver 15 drives the thread mechanism 8 in accordance with the thread drive signal. The thread mechanism 8 comprises, though not shown, a main shaft for holding the pickup 1, a thread motor, transmission gears, etc. A desired slide movement of the pickup 1 is performed by the thread driver 15 driving the thread motor 8 in accordance with the thread drive signal.

The above-described various operations of the serve system and the writing/reproducing system are controlled by the system controller 10 constructed by a microcomputer.

The system controller 10 executes various kinds of processing in accordance with commands supplied from the host computer 80.

For example, when a read command requesting a transfer of some data recorded on the disk 90 is supplied from the host computer 80, seek operation control is first performed with a designated address being an object. In other words, the system controller 10 instructs the servo processor 14 to execute an access operation of the pickup 1 while an address designated by the seek command is set as a target.

Thereafter, the system controller 10 executes operation control required for transferring data in the designated data zone to the host computer 80. More specifically, the system controller 10 transfers requested data by executing such operations as to read the data from the disk 90, decode it, and buffer the decoded data.

Also, when a write command is issued from the host computer 80, the system controller 10 first moves the pickup 1 to an address in which data is to be written. Then, the system controller 10 instructs the encoding/decoding unit 12 to execute the above-described encoding processing on the data transferred from the host computer 80, thereby creating an EFM signal.

Then, the write data WDATA from the write strategy unit 21 is supplied to the laser driver 18, as described above, to execute writing of the data.

2. Configuration of Write Strategy Unit and Delay Processing

Figure 2:
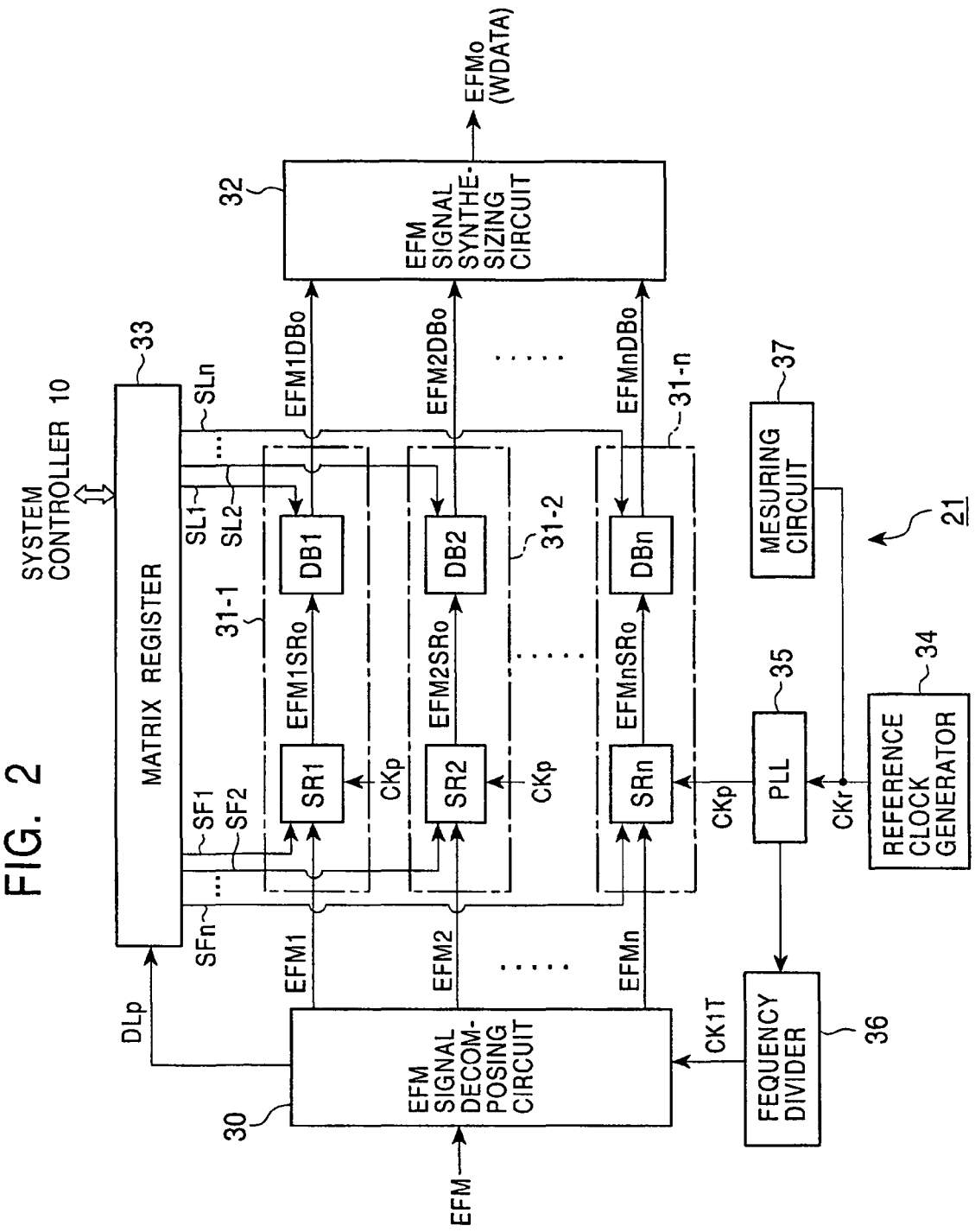
FIG. 2 is a block diagram of a write strategy unit of the disk drive according to the embodiment.

FIG. 2 shows the configuration of the write strategy unit 21 of the disk drive for adjusting the laser drive pulse in the writing operation.

As shown in FIG. 2, the write strategy unit 21 comprises an EFM signal decomposing circuit 30, delay sections 31-1 to 31-n, an EFM signal synthesizing circuit 32, a matrix register 33, a reference clock generator 34, a PLL circuit 35, a frequency divider 36, and a measuring circuit 37. For example, these components are incorporated in a one-chip IC.

The reference clock generator 34 generates a reference clock CKr by a quartz oscillator, the clock CKr serving as a reference for processing of the EFM signal. For convenience of description, the reference clock CKr is assumed, by way of example, to have a frequency of 34.5 Hz.

The PLL circuit 35 generates a PLL clock CKp that is in sync with the reference clock CKr and has a frequency a predetermined number times that of the reference clock CKr. For convenience of description, it is assumed that the PLL circuit 35 generates the PLL clock CKp having a frequency quadruple times that of the reference clock CKr, i.e., 138 MHz.

The frequency divider 36 divides the frequency of the PLL clock CKp and generates a clock having an EMF frequency, i.e., a clock CK1T having a cycle corresponding to a 1T period of the EFM signal.

A ratio of frequency division carried out by the frequency divider 36 is variably set depending on a writing rate to be executed. For example, in once-speed writing, the clock CK1T=4.3 MHz is resulted from frequency division at a ratio of 1/32. In double-speed writing, the clock CK1T=8.6 MHz is resulted from frequency division at a ratio of 1/16. In quadruple-speed writing, the clock CK1T=17.25 MHz is resulted from frequency division at a ratio of 1/8. In 8-time speed writing, the clock CK1T=34.5 MHz is resulted from frequency division at a ratio of 1/4.

A number n of delay sections 31-1 to 31-n are formed in the write strategy unit 21. The delay sections comprise respectively shift registers SR (SR1, . . . , SRn) and delay blocks DB (DB1, . . . , DBn).

Figure 3:
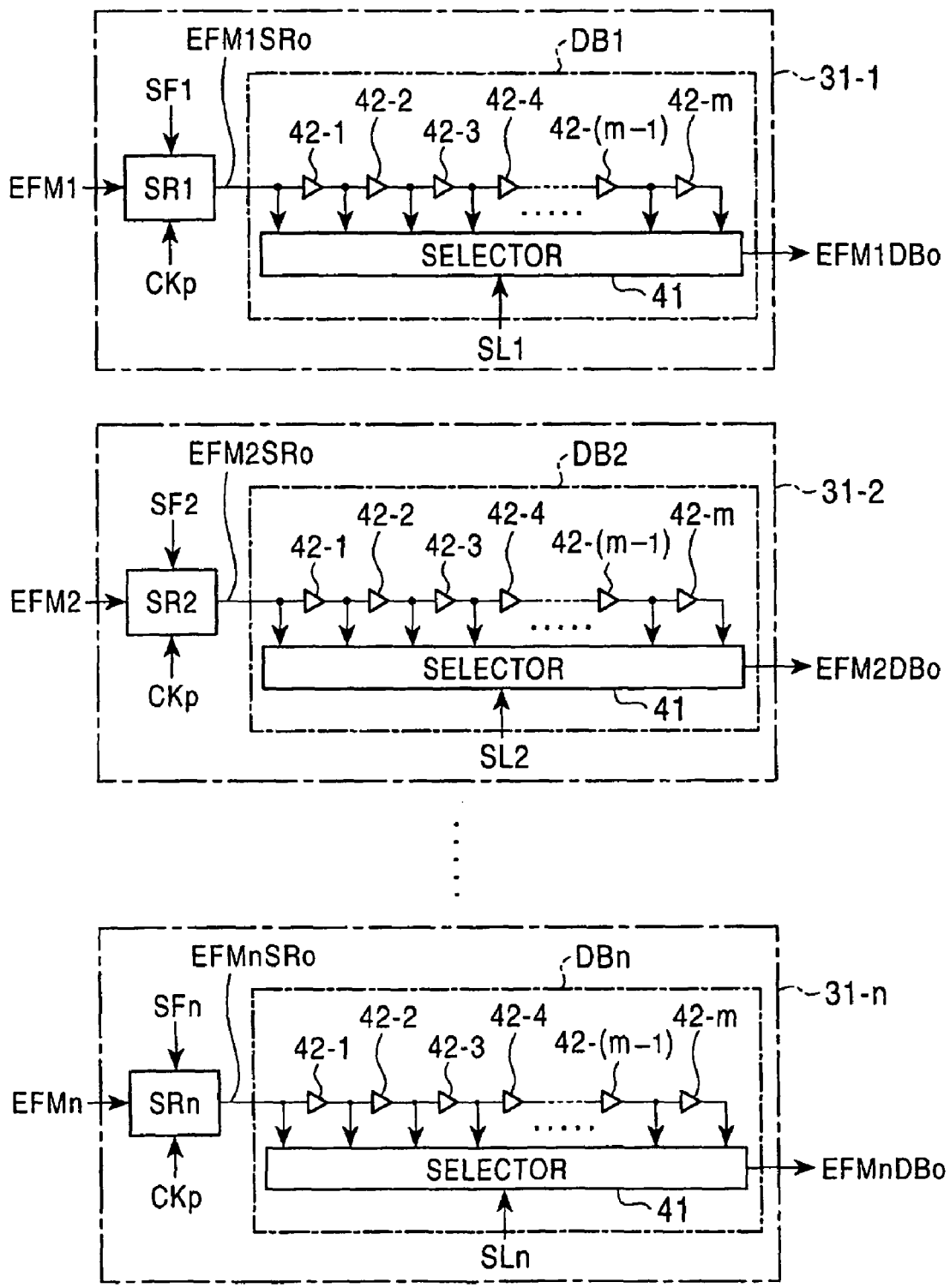
FIG. 3 is a block diagram of a delay section of the write strategy unit in the embodiment.

FIG. 3 shows the configurations of the delay sections 31-1 to 31-n in detail. As shown, each of the delay blocks DB1, . . . , DBn comprises a delay line constituted by m stages of delay gates (42-1 . . . , 42-m), and a selector 41. Herein, "m" is assumed to be, e.g., 40. In other words, the delay line is formed by 40 delay gates. The reason why 40 stages of delay gates are formed will be described later.

The selector 41 selects one tap of the delay line to change a delay time of the delay block DB.

Referring to FIG. 2, the EFM signal supplied from the encoding/decoding unit 12, shown in FIG. 1, is supplied to the FEM signal decomposing circuit 30. The EFM signal decomposing circuit 30 creates a number n of signals EFM1 to EFMn from the EFM signal and supplies them to the delay sections 31-1 to 31-n. Herein, "number n" represents a numeral value corresponding to the number of points at which the laser driver pulse is adjusted in the direction of the time base. Those points correspond to, for example, the points indicated by marks o in FIG. 14. In other words, the EFM signal decomposing circuit 30 creates a number n of signals EFM1 to EFMn, which are obtained by decomposing the EFM signal at each of rising and falling points of the laser driver pulse, for adjustment in the direction of the time base, thereby allowing the delay sections 31-1 to 31-n to execute the delay processing individually.

The PLL clock CKp is supplied to each of the shift registers SR1, . . . , SRn of the delay sections 31-1 to 31-n so that the delay processing (pulse shift) can be performed in any desired number of clocks with accuracy in units of the PLL clock CKp. Given the frequency of the PLL clock CKp to be 138 MHz, as described above, each of the shift registers SR1, . . . , SRn can execute the delay processing with accuracy in units of a period corresponding to one cycle of the PLL clock CKp, i.e., in units of 7 nsec.

Shift amount control signals SF1, . . . , SFn for adjusting respective delay times in a variable manner are also supplied to the shift registers SR1, . . . , SRn from the matrix register 33.

The shift registers SR1, . . . , SRn produce signals EFM1SRo, . . . , EFMnSRo obtained by shifting (delaying) the signals EFM1, . . . , EFMn in accordance with the shift amount control signals SF1, . . . , SFn, and then supply the produced signals to the delay blocks DB1, . . . , DBn of the next stages, respectively.

The matrix register 33 supplies select signals SL1, . . . , SLn to the delay blocks DB1, . . . , DBn which are, as shown in FIG. 3, formed in the delay sections 31-1 to 31-n by using delay lines. More specifically, as shown in FIG. 3, the select signals SL1, . . . , SLn are supplied to respective selectors 41 in the delay blocks DB1, . . . , DBn for selecting taps designated by the select signals SL, . . . , SLn and outputting respective delayed signals.

The delay blocks DB1, . . . , DBn are each constituted to be able to vary a delay time in smaller time units at least one cycle (7 nsec in this embodiment) of the PLL clock CKp. For example, each delay block can vary a delay time in the range of 1-6 nsec in units of 1 nsec. The select signals SL, . . . , SLn each designate one of tap values corresponding to 1-6 nsec.

Signals EFM1DBo, . . . , EFMnDBo delayed by the delay blocks DB1, . . . , DBn are synthesized in the EFM signal synthesizing circuit 32. In other words, the EFM signal synthesizing circuit 32 creates and outputs a synthesized EFM signal EFMO having a waveform adjusted in the direction of the time base relative to the waveform of the original EFM signal. The synthesized EFM signal EFMO provides laser drive pulses supplied to the laser driver 15.

The respective delay times, which are provided by the shift registers SR1, . . . , SRn and the delay blocks DB1, , . . . , DBn in the delay sections 31-1 to 31-n as described above, are controlled by the shift amount control signals SF1, . . . , SFn and the select signals SL1, . . . , SLn supplied from the matrix register 33. The matrix register 33 generates the shift amount control signals SF1, . . . , SFn and the select signals SL1, , . . . , SLn based on information DLp supplied from the FEM signal decomposing circuit 30.

The information DLP is herein information representing the length of a pit going to be recorded and the length of a land just before the pit, these pit and land being provided as levels of the EFM signal.

Figure 4:
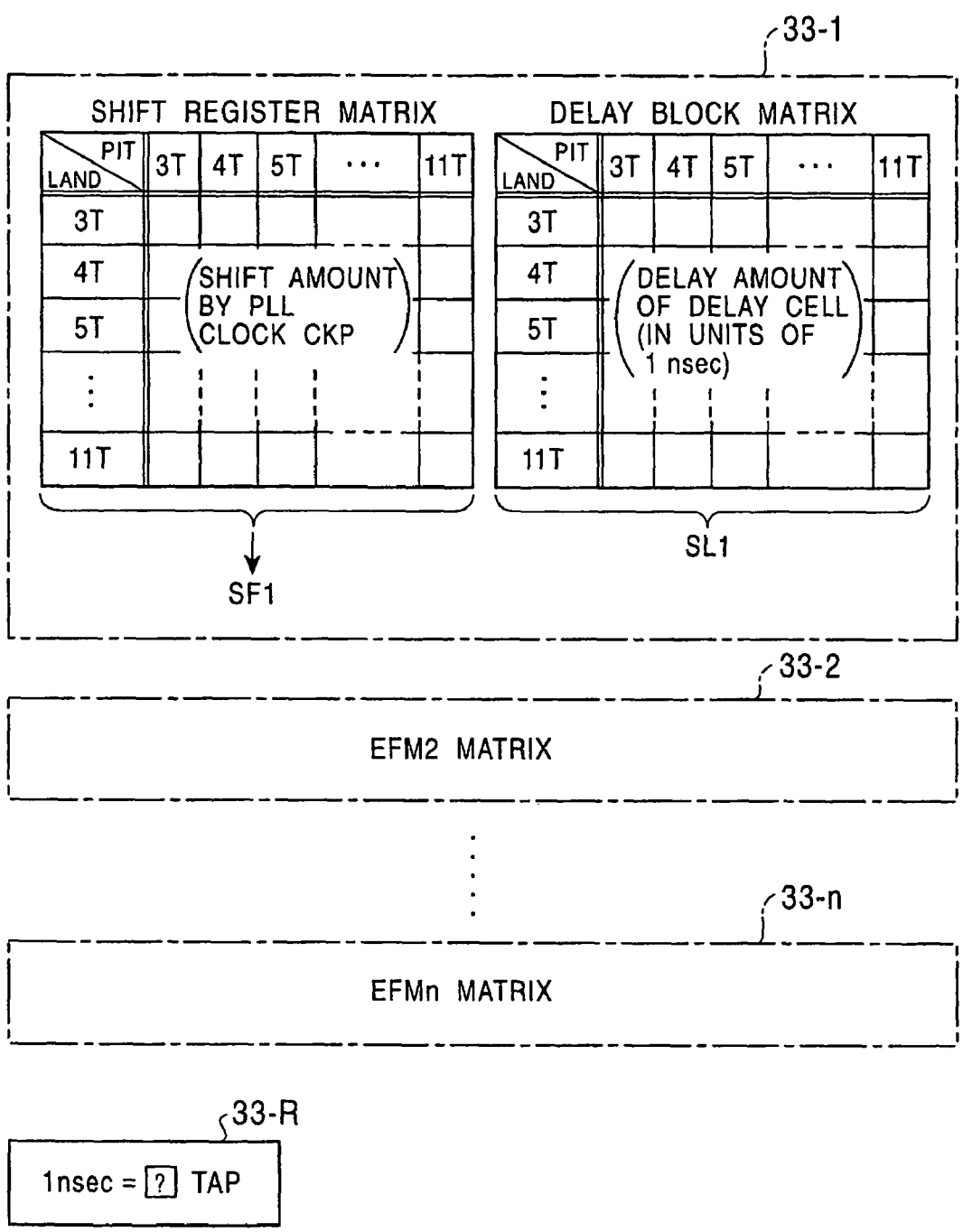
FIG. 4 is an explanatory view of a matrix register of the write strategy unit in the embodiment.

FIG. 4 schematically shows the detailed configuration of the matrix register 33.

As shown in FIG. 4, the matrix register 3 includes an EFM1 matrix 33-1, an EFM2 matrix 33-2, . . . , an EFMn matrix 33-n corresponding respectively to the delay sections 31-1 to 31-n.

A shift register matrix and a delay block matrix are formed in each of the EFM1 matrix 33-1, an EFM2 matrix 33-2, . . . , an EFMn matrix 33-n.

Looking at the EFM1 matrix 33-1, it includes a shift register matrix corresponding to the shift register SR1 of the delay section 31-1 and a delay block matrix corresponding to the delay block DB1 of the delay section 31-1.

The shift register matrix is constituted as a matrix in combination of the pit length ranging from 3T to 11T and the land length similarly ranging from 3T to 11T, and stores shift amounts corresponding to combinations of the pit length and the land length. In other words, the shift register matrix stores values indicating how many numbers of the PLL clocks CKp the EFM1 signal should be shifted.

Also, the delay block matrix is constituted as a matrix in combination of the pit length ranging from 3T to 11T and the land length similarly ranging from 3T to 11T, and stores delay amounts corresponding to combinations of the pit length and the land length. In this embodiment, the delay block matrix stores values indicating delay amounts, i.e., delay times of the delay block DB1, in units of 1 nsec, for example.

Likewise, though not shown, the EFM2 matrix 33-2, . . . , the EFMn matrix 33-n include shift register matrixes and delay block matrixes corresponding to the shift registers SR2, . . . , SRn and the delay blocks DB2, . . . , DBn, respectively.

In addition, the matrix register 33 includes, as a measurement result register 33-R, a register for storing how many taps of the delay line in each of the delay blocks DB1, . . . , DBn correspond to 1 nsec. A value stored in this register is determined based on a result of measurement made by the measuring circuit 37 described later.

Values stored in each shift register matrix and each delay block matrix are written by the system controller 10. More specifically, the system controller 10 updates the values stored in each shift register matrix and each delay block matrix depending on setting of the writing rate such as a 1- to 8- or 12-time speed, the type and characteristics of the disk 90, etc.

Those values, which should be stored depending on the various cases, may be stored in the system controller 10 or a nonvolatile memory (not shown) beforehand.

The matrix register 33 having the above-described configuration reads values from each shift register matrix and each delay block matrix in accordance with the information DLp from the FEM signal decomposing circuit 30, i.e., the combination of the length (3T -11T) of a pit going to be recorded and the length (3T -11T) of a land just before the pit, and then outputs the read values as the shift amount control signals SF1, . . . ,SFn and the select signals SL1, . . . , SLn.

In this connection, the value stored in each delay block matrix represents an amount of delay time, and the correlation between the delay time and the number of taps is not always constant because a delay line has a variation in delay time. On the other hand, since the write strategy unit 21 is constituted by a one-chip IC, it can be regarded that there are no differences in variation among the delay lines of the delay blocks DB1, . . . , DBn, i.e., that the delay lines have the same characteristics. In this embodiment, therefore, characteristics of the delay block are measured through the operation of the measuring circuit 37, and a value to be stored in the measurement result register 33-R is derived from a result of the measurement, as described later in detail.

By storing a value, which represents how many taps of the delay line correspond to 1 nsec, in the measurement result register 33-R, the value of each of the select signals SL1, . . . , SLn, i.e., the number of taps to be selected by each selector 41, can be obtained as a value resulting from multiplying the value of the delay block matrix and the value stored in the measurement result register 33-R.

For example, when the measurement result register 33-R stores a value of 4, i.e., 1 nsec=4 taps, and a value of 3 nsec is obtained from the delay block matrix based on the pit-and-land combination provided by the information DLp, the select signal SL can be given as a value designating 4×3=12 taps.

Figure 5:
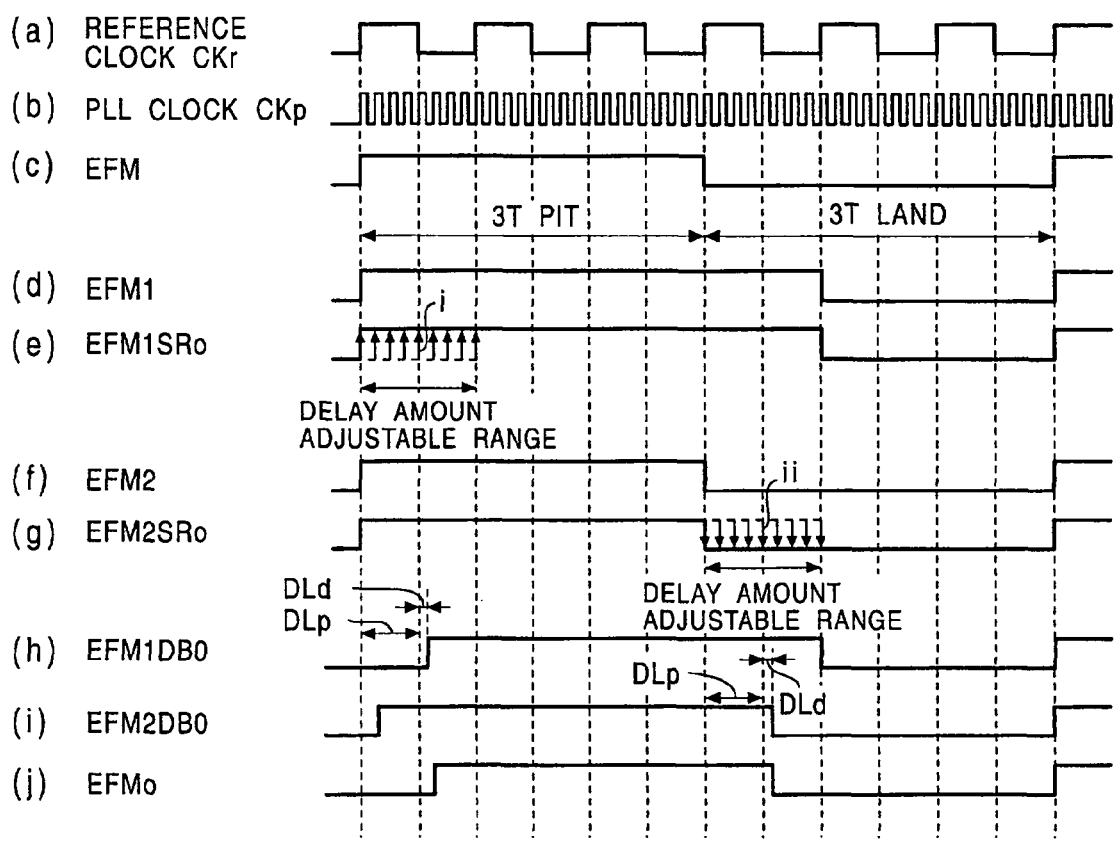
FIGS. 5(a) to 5(j) are timing charts for explaining delay processing in the embodiment.

The operation for adjusting a waveform of the EFM signal (laser drive pulse) by the write strategy unit 21 having the above-described configuration will be described below with reference to FIGS. 5 and 6.

FIGS. 5(a) and 5(b) represent respectively the reference clock CKr of, e.g., 34.5 MHz and the PLL clock CKp of, e.g., 138 MHz.

The following description is made on the waveform adjustment, i.e., the delay operation, in connection with the case where an EFM signal having levels corresponding to 3T pits and 3T lands is supplied as shown in FIG. 5(c).

For brevity of the description, however, it is assumed that the FEM signal decomposing circuit 30 decomposes the EFM signal into two signals EFM1 and EFM2.

In this case, by way of example, the signal EFM1 of FIG. 5(d) for adjusting the rising of the EFM signal and the signal EFM2 of FIG. 5(f) for adjusting the falling of the EFM signal are supplied respectively to the delay sections 31-1 and 31-2, whereby the rising and falling of the EFM signal (laser drive pulse) are adjusted in the direction of the time base. This case represents an example in which the EFM signal is adjusted in the direction of the time base at two points for each laser drive pulse as shown in FIG. 14(b).

When using such a laser drive pulse as shown in FIG. 14(d), the laser drive pulse is obtained by combining two pulses, shown in FIGS. 14(b) and 14(c), with each other, the EFM signal is adjusted in the direction of the time base at a total of four points for each laser drive pulse, i.e., two points shown in FIG. 14(b) and two points shown in FIG. 14(c). In this case, the FEM signal decomposing circuit 30 decomposes the EFM signal into four signals EFM1 to EFM4, which are subjected to the delay processing in the delay sections 31-1 to 31-4, respectively.

Further, when using such a laser drive pulse called a pulse train as shown in FIG. 14(e), the EFM signal is adjusted in the direction of the time base at a total of six points, i.e., at the rising and falling of a first pulse, the rising and falling of a last pulse, and the rising and falling of an intermediate pulse. In this case, therefore, the FEM signal decomposing circuit 30 decomposes the EFM signal into six signals EFM1 to EFM6, which are subjected to the delay processing in the delay sections 31-1 to 31-6, respectively.

The signal EFM1 of FIG. 5(d) is first delayed in the shift register SRI of the delay section 31-1. The shift register SRI is able to delay the signal EFM1 in units of the PLL clock CKp. More specifically, as indicated by "delay amount adjustable range" in FIG. 5(e), the delay time can be set to such an extent that the rising of the signal EFM1 falls within the range of −0.5T to +0.5T on the time base in units of the PLL clock CKp.

In other words, the delay amount adjustable range is set such that a shift amount can be provided by any one of 0 to 7 clocks in units of the PLL clock CKp. This shift amount is controlled by the shift amount control signal SF1 from the matrix register 33.

Also, the signal EFM2 of FIG. 5(f) is first delayed in the shift register SR2 of the delay section 31-2. The shift register SR2 is likewise able to delay the signal EFM2 in units of the PLL clock CKp. More specifically, as indicated by "delay amount adjustable range" in FIG. 5(g), the falling of the signal EFM2 can be set within the range of −0.5T to +0.5T on the time base in units of the PLL clock CKp.

A shift amount within the delay amount adjustable range is controlled by the shift amount control signal SF1 from the matrix register 33.

It is here assumed that the rising of a signal EFM1SRo outputted from the shift register SRi is delayed to the timing indicated by (i) in FIG. 5(e). This signal EFM1SRo is then supplied to the delay block DB1.

The delay block DB1 delays the signal EFM1SRo through a delay time that is controlled by the select signal SL1 from the matrix register 33, and outputs a delayed signal EFM1DBo.

Accordingly, as shown in FIG. 5(h), the rising timing of the signal EFM1DBo is delayed from the rising timing of the signal EFM1, shown in FIG. 5(d), through the sum of a delay time DLp given by the shift register SR1 and a delay time DLd given by the delay block DB1.

Also, it is here assumed that the falling of a signal EFM2SRo outputted from the shift register SR2 is delayed to the timing indicated by (ii) in FIG. 5(g). Then, this signal EFM2SRo is delayed by the delay block DB2 through a delay time that is controlled by the select signal SL2 from the matrix register 33, and is outputted as a delayed signal EFM2DBo.

Accordingly, as shown in FIG. 5(i), the falling timing of the signal EFM2DBo is delayed from the falling timing of the signal EFM2, shown in FIG. 5(f), through the sum of a delay time DLp given by the shift register SR2 and a delay time DLd given by the delay block DB2.

Figure 6:
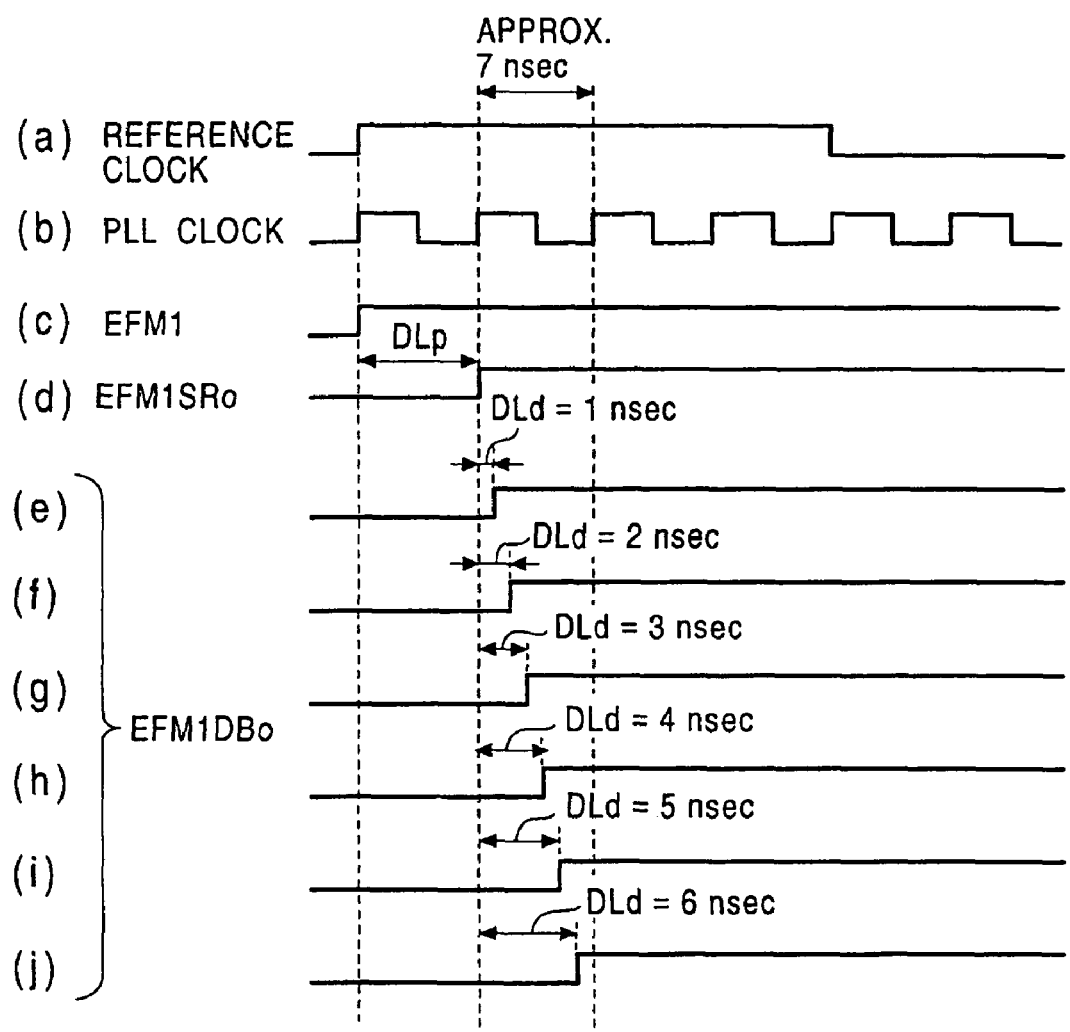
FIGS. 6(a) to 6(j) are timing charts for explaining delay processing in the embodiment.

The delay block DB1 executes the delay operation as shown in FIG. 6. FIGS. 6(a) and 6(b) represent respectively the reference clock CKr of FIG. 5(a) and the PLL clock CKp of FIG. 5(b) in enlarged scale.

As described above, the delay time given by the shift register SR1 is in units of approximately 7 nsec. Assuming now that, as shown in FIGS. 6(c) and 6(d), the signal EFM1SRo having been delayed by the shift register SR1 through one PLL clock, i.e., approximately 7 nsec, is supplied to the delay block DB1, a desired delay time is selected in units of 1 nsec from among six values, shown in FIGS. 6(e) to 6(j), in a succeeding PLL clock period, whereby the delayed signal EFM1DBo is outputted from the delay block DB1. This selection of the delay time in the delay block DB1, i.e., a tap selected by the selector 41, is controlled by the select signal SL1 from the matrix register 33.

The delay block DB2 also executes the delay operation in a similar manner as described above.

The signals EFM1DBo, EFM2DBo having been processed by the delay sections 31-1, 31-2, by way of example, as shown in FIGS. 5(h) and 5(i) are then supplied to the EFM signal synthesizing circuit 32. The EFM signal synthesizing circuit 32 synthesizes and creates a signal EFMO, shown in FIG. 5(j), by computing the logical product of the signals EFM1DBo and EFM2DBo both supplied to it. The signal EFMO has a waveform adjusted in the direction of the time base as compared with the EFM signal of FIG. 5(c), and is supplied, as a laser drive pulse, to the laser driver 18.

Further, as described above, the delay time given through the delay processing made for adjustment of the EFM signal in the direction of the time base is controlled based on the relationship between the length of a pit going to be recorded and the length of a land just before the pit. By driving the laser diode 4 with the laser drive pulse thus obtained, therefore, appropriate formation of each pit can be realized in consideration of heat accumulation and thermal conductivity of a recording layer.

Additionally, in this embodiment, the shift register SR performs the delay processing in units of, e.g., 7 nsec, and the delay block DB performs the delay processing in units of, e.g., 1 nsec. Therefore, when the reference clock and the PLL clock have the frequency relationship as described above, by way of example, in connection with FIG. 5, the shift register SR can provide a delay of approximately 50 nsec at maximum, whereas the delay block DB can provide a delay of 1 nsec at minimum. Stated otherwise, delay control over a very wide range can be performed by a circuit configuration that can be easily realized.

Thus, when this embodiment is applied to, for example, a disk drive adaptable for a wide range of the writing rate such as a 1- to 8- or 12-time speed, it is possible to realize control of the EFM signal in the direction of the time base with high accuracy in a manner adaptable for any writing rate. In other words, this embodiment is suitable for a system for writing data in a disk at a high speed and a high density.

Moreover, since the delay blocks DB1, . . . , DBn are built in an IC, that is, since external delay lines are not used, input/output pints for respective taps of the delay lines are not longer needed, resulting in an advantage that the number of IC input/output pins can be greatly reduced.

A delay line exhibits a relatively large change in characteristics depending on temperature changes. In this embodiment, however, since the delay processing in the first stage is performed by the shift registers SR1, . . . , SRn for delaying the EFM signal with high-speed PLL clocks, it is possible to ensure an accuracy level at least corresponding to the resolution of the PLL clocks CKp. This results in another advantage that the delay line is less susceptible to changes in characteristic caused by temperature changes.

Each of the delay blocks DB1, . . . , DBn has a number m of delay gates 41-1, . . . , 42-m, and the number m is 40, for example, as described above. Although 40 stages of delay lines are employed only by way of example, the reason why 40 stages are used in this embodiment is as follows.

Assuming, as mentioned above, that the frequency of the PLL clock CKp is 138 MHz and a delay time is obtained in units of 7 nsec by the shift registers SR1, . . . , SRn, the delay blocks DB1, . . . , DBn are each required to be able to delay the EFM signal within a period of 7 nsec in units of 1 nsec. This requires a delay time of at least 6 nsec to be obtained by the entirety of the delay line.

Assuming here that a delay gate capable of providing a delay time of 3 nsec is employed, 20 stages of delay gates must be used to form a delay line in order to attain a delay time of 6 nsec as a whole.

It is however said that a delay time of a delay gate in an IC varies over the range of −50% to 180%.

In other words, it must be taken into consideration that, even when a delay gate capable of providing a delay time of 3 nsec is employed, an actually obtained delay time is a certain value within the range of 0.15 nsec to 0.54 nsec.

In the worst case, therefore, a delay time of only 0.15 nsec is provided by one delay gate. To obtain a delay time of 6 nsec as a whole in the worst case, 40 stages of delay gates are required.

This is the reason why a delay line comprising 40 stages of delay gates is used, by way of example, in this embodiment.

Of course, the number of stages required is different depending on various conditions such as selection of a delay time of one delay gate, a clock frequency, and a maximum writing rate of a disk drive. Under individual conditions, the delay block may be designed taking into account the above-described variations in delay time of delay gates.

The necessity of taking into account the variations in delay time of delay gates means that it is not actually known what tap of the delay line should be selected to obtain a delay time of, e.g., 1 nsec.

In this embodiment, therefore, the measuring circuit 37 measures characteristics of the delay block DB, determines based on a result of the measurement how many taps correspond to a delay time of 1 nsec, and stores the number of taps in the measurement result register 33-R of the matrix register 33. Since the delay blocks DB1, . . . , DBn are formed in a one-chip IC, they can be regarded as having substantially the same characteristics. Accordingly, the information stored in the measurement result register 33-R can be used in common to the delay blocks DB1, . . . , DBn.

3. Configuration of Measuring Circuit and Measurement Processing

Figure 7:
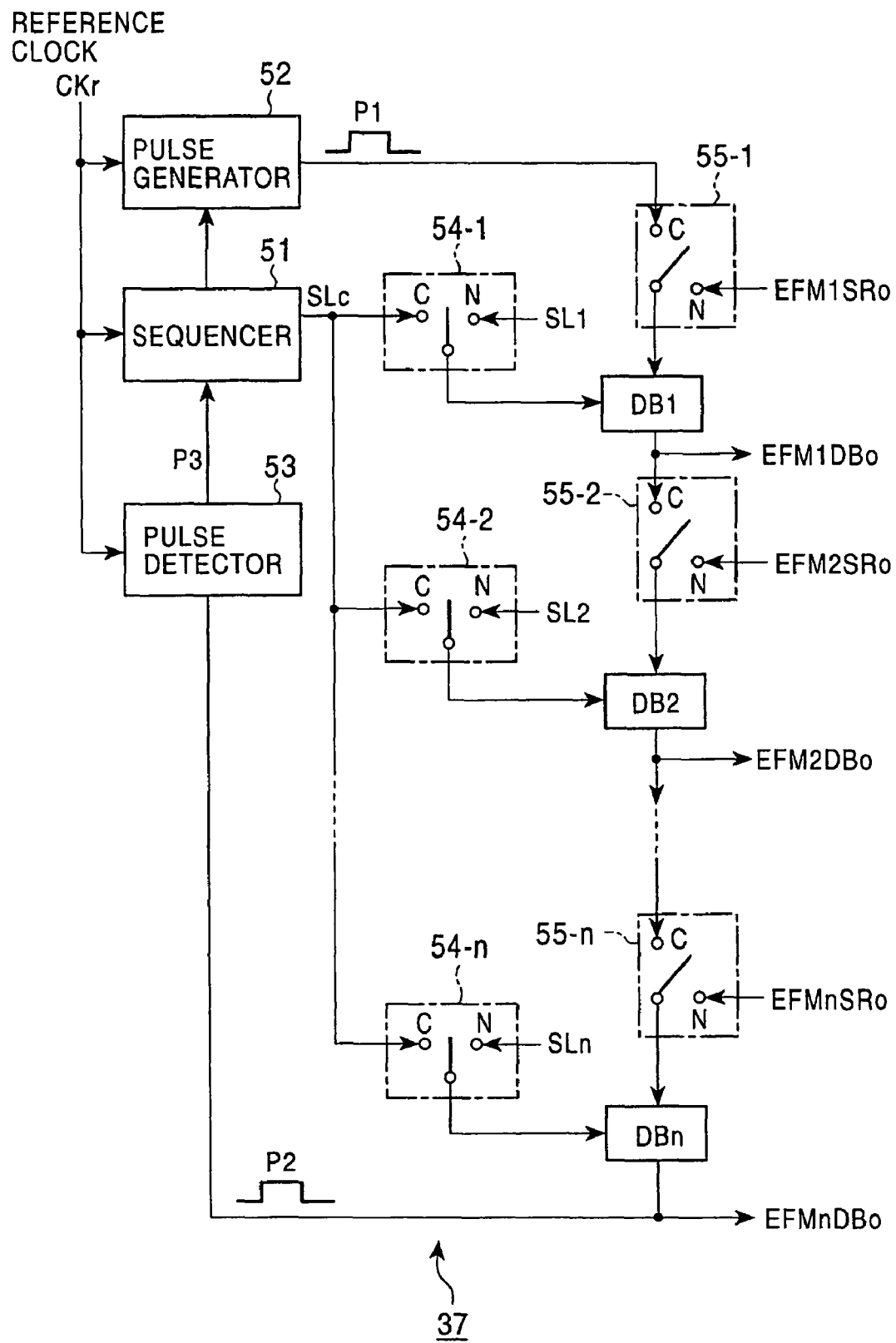
FIG. 7 is a block diagram of one example of a measuring circuit in the embodiment.

FIG. 7 shows the configuration of the measuring circuit 37 for measuring characteristics of the delay blocks DB1, . . . , DBn.

The measuring circuit 37 shown in FIG. 7 has a circuit configuration in which a plurality of delay blocks (DB1, . . . , DBn), shown in FIG. 2, are connected in series for measuring their characteristics.

In FIG. 7, components except for the delay blocks DB1, . . . , DBn constitute the measuring circuit 37. Specifically, the measuring circuit 37 comprises a sequencer 51, a pulse generator 52, a pulse detector 53, switches 54-1 . . . , 54n, and switches 55-1, . . . , 55-n.

A reference clock CKr is the same as one, shown in FIG. 2, used for generating the signals EFM1, EFM2, . . . , EFMn. The reference clock CKr is supplied to the sequencer 51, the pulse generator 52, and the pulse detector 53.

The sequencer 51 is operated by the reference clock CKr and controls the entirety of the measuring circuit 37.

The pulse generator 52 generates a single pulse P1 in response to a trigger signal from the sequencer 51.

The switches 55-1, . . . , 55-n serve to select the single pulse from the pulse generator 52 or the signals EFM1SRo, . . . , EFMnSRo from the shift registers SR1, . . ., SRn as stages upstream of the delay blocks DB1, . . . , DBn. In other words, during the normal writing operation, the switches 55-1, . . . 55-n are all in states where their N terminals are connected, whereby the circuit configuration shown in FIG. 2 is provided.

On the other hand, when the measuring operation is performed by the measuring circuit 37, the switches 55-1, . . . , 55-n are all brought into states where their C terminals are connected, whereby the delay blocks DB1, . . . , DBn are disconnected from the circuit configuration shown in FIG. 2 and are connected in series. Also, this state allows the single pulse P1 from the pulse generator 52 to be supplied to all of the delay blocks DB1, . . . , DBn connected in series.

The switches 54-1, . . . , 54n serve to selectively supply the a select signal SLc outputted from the sequencer 51 and the select signals SL, . . . , SLn outputted from the matrix register 33 to the delay blocks DB1, . . . , DBn.

During the normal writing operation, the switches 54-1, . . . , 54-n are all in states where their R terminals are connected, whereby the select signals SL1, . . . , SLn, which are outputted from the matrix register 33 as described above in connection with FIG. 2, are supplied respectively to the delay blocks DB1, . . . , DBn.

On the other hand, when the measuring operation is performed by the measuring circuit 37, the switches 54-1, . . . , 54-n are all brought into states where their C terminals are connected. As a result, the select signal SLc outputted from the sequencer 51 is supplied to all of the delay blocks DB1, . . . ,DBn.

In the measuring operation, since one select signal SLc from the sequencer 51 is supplied in common to all of the delay blocks DB1, . . . , DBn, an output corresponding to the same number of taps is selected in each of the delay blocks DB1, . . . , DBn. Thus, all the delay blocks DB1, . . . , DBn pass the single pulse P1 therethrough always at the same delay value. A single pulse P2 having passed the delay blocks DB1, . . . , DBn connected in series is supplied to the pulse detector 53.

Each of the delay blocks DB1, . . . , DBn provides the same delay time. Therefore, a delay value provided by one delay block DB is substantially equal to a value resulting from dividing the total delay value of the serially connected delay blocks DB1, . . . , DBn (i.e., the time lapsed the timing at which a single pulse is generated from the pulse generator to the timing at which the single pulse is inputted to the pulse detector) by the number of the delay blocks.

Then, the sequencer 51 changes a value of the select signal SLc one by one so that the number of taps selected in each of the delay blocks DB1, . . . , DBn is increased in the order of 0, 1, 2, 3 to the maximum number of taps.

The pulse detector 53 is a circuit for detecting a change point of the single pulse P2 that is resulted from the single pulse P1 outputted from the pulse generator 52 after it has passed a plurality of delay blocks. An input portion of the pulse detector 53, to which the pulse P2 is inputted, is of a double-buffer structure comprising two stages of flip-flops for coping with metastability. A pulse P3 outputted from the flip-flops of the double-buffer structure is supplied to the sequencer 51.

The sequencer 51, the pulse generator 52 and the pulse detector 53 are each operated with accuracy of the reference clocks, and therefore fluctuations in operation of those components due to variations in ambient temperature, source voltage, lot-dependent characteristics, etc. are as small as practically negligible in comparison with fluctuations in operation of the delay blocks DB1, . . . , DBn.

The measuring operation of the measuring circuit 37 having the above-described configuration will be described with reference to FIG. 8 and FIGS. 9 to 12.

Figure 8:
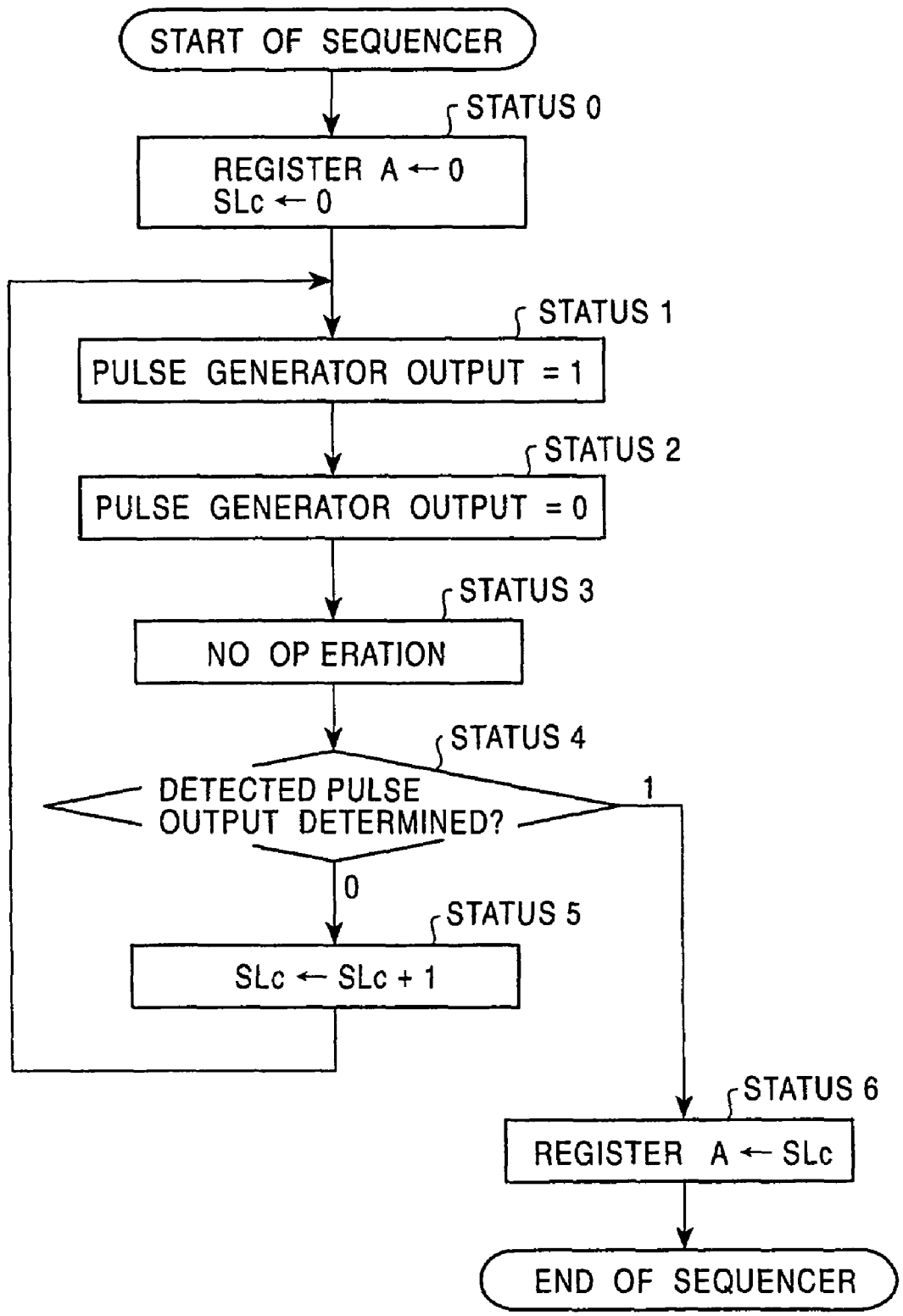
FIG. 8 is a flowchart of a measurement processing in the embodiment.

FIG. 8 is a flowchart representing the operation of the sequencer 51. The sequence shown in FIG. 8 will be first described in a general aspect, and the operation in accordance with the sequence shown in FIG. 8 will be then described in more detail.

STATUS 1 to STATUS 6 in FIG. 8 represent processing periods each corresponding to a period of one cycle of the reference clock CKr.

When the sequence for measuring characteristics of the delay block DB is started, the sequencer 51 first initializes a register A for storing a measurement result to 0 and also initializes the select signal SLc to 0 in STATUS 0. In other words, the number of tap stages designated to the delay blocks DB1, . . ., DBn is set to "0" (first tap).

Then, the sequencer 51 instructs the pulse generator 52 to generate the pulse P1 in STATUS 1.

In STATUS 2, the sequencer 51 renders the output of the pulse generator 52 to be "0". Through the processing in STATUS 1 and 2, the single pulse P1 corresponding to a period of one reference clock is outputted from the pulse generator 52. The single pulse P1 is supplied as the pulse P2 to the pulse detector 53 through the serially connected delay blocks DB1, . . . , DBn.

In STATUS 3, the sequencer 51 execute no operation. In the period of STATUS 3, the flip-flop of the first stage in the double-buffer structure of the pulse detector 53 samples the pulse P2 at the rising of the reference clock CKr.

Subsequently, in the period of STATUS 4, the flip-flop of the latter stage in the double-buffer structure of the pulse detector 53 samples and outputs an output signal from the flip-flop of the first stage in the double-buffer structure. This output signal is the pulse P3. Through processing in STATUS 4, the sequencer 51 determines a value ("0" or "1") of the pulse P3.

If the pulse P3 is "0" in the period of STATUS 4, the sequencer 51 increments the value of the select signal SLc in STATUS 5, and then returns to STATUS 1 at the timing of the next reference clock CKr.

Stated otherwise, in a loop of STATUS 1 to STATUS 5, the processing is repeatedly executed while the tap selected in each of the delay blocks DB1, . . . , DBn is changed in order. At first, because of the select signal SLc=0 being set, the processing of STATUS 1 to STATUS 4 is executed in a state where the first tap is selected in each of the delay blocks DB1, . . . , DBn. Next, the select signal SLc=0 is set and the processing of STATUS 1 to STATUS 4 is executed in a state where the second tap is selected in each of the delay blocks DB1, . . . , DBn.

The above-mentioned processing is repeated until the pulse P3="1" is detected in STATUS 4.

If the sequencer 51 determines the pulse P3="1" in STATUS 4 at a certain point in time, the processing escapes from the loop of STATUS 1 to STATUS 4 and goes to STATUS 6 where the value selected at that point in time, i.e., the tap number selected by the select signal SLc at that point in time, is stored as a measurement value in the register A, thereby ending a sequence of the measuring operation.

The foregoing measurement processing will be described below in more detail.

Figure 9:
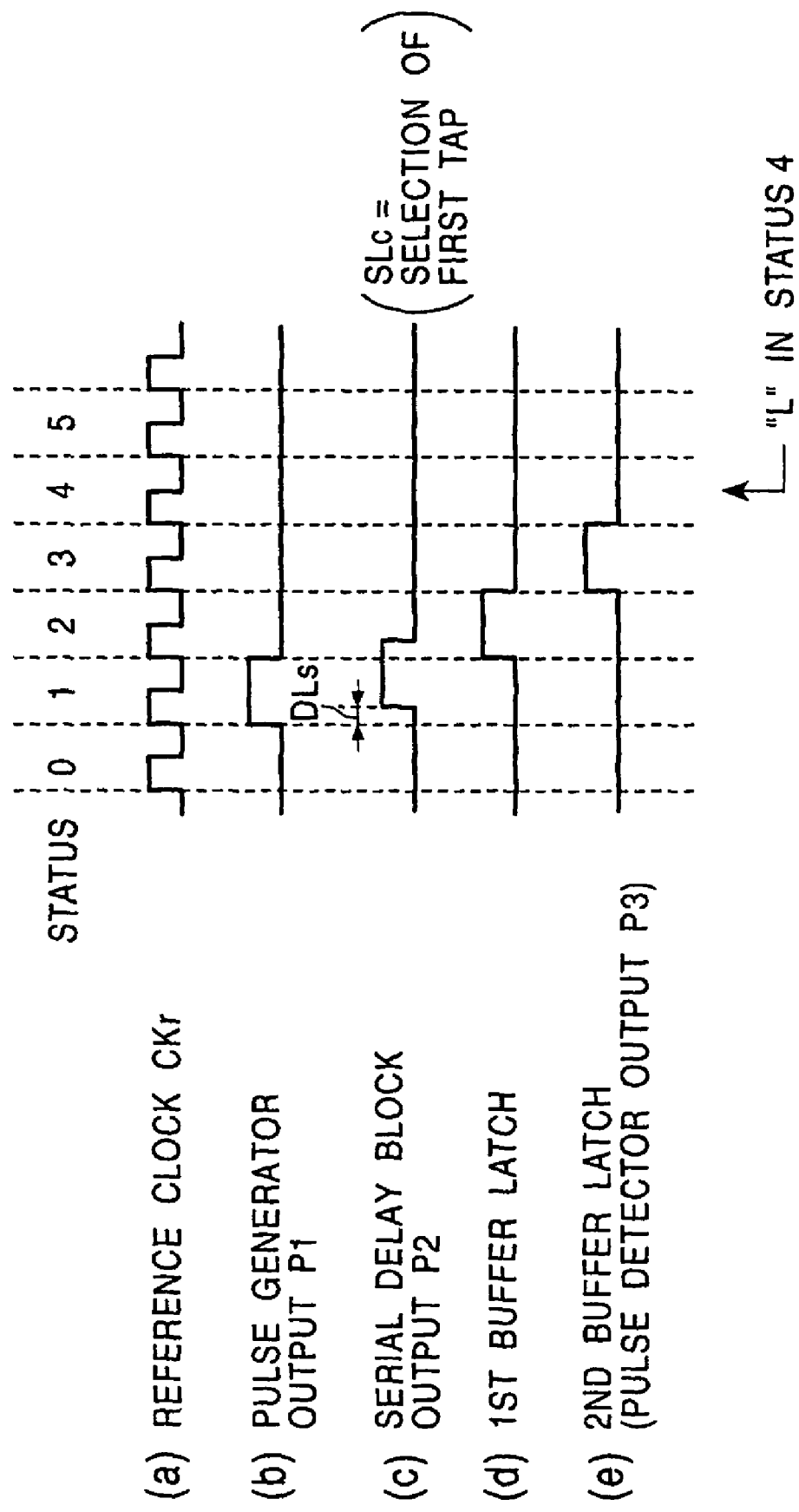
FIGS. 9(a) to 9(e) are timing charts for explaining the measurement processing in the embodiment.

FIG. 9 shows a period from the start of the sequence in STATUS 0 until the sequence reaches STATUS 5 for the first time. FIG. 9(a) represents the reference clock CKr.

After the initialization has been performed in STATUS 0 as described above, the single pulse P1 is outputted from the pulse generator 52 through the processing in STATUS 1 and 2 as shown in FIG. 9(b).

At this time, since the first tap is selected in each of the delay blocks DB1, ..., DBn by the select signal SLc, the pulse P2 obtained through the serially connected delay blocks DB1, ..., DBn has a slight delay time DLs as compared with the pulse P1, as shown in FIG. 9(c).

The pulse P2 is latched by the flip-flop of the first stage in the pulse detector 53 as described above, which outputs a pulse shown in FIG. 9(d). This pulse is then latched by the flip-flop of the latter stage, which outputs a pulse shown in FIG. 9(e). This pulse is supplied as the pulse P3 to the sequencer 51.

In the period of STATUS 4, the sequencer 51 determines a value of the pulse P3 shown in FIG. 9(e). As seen from FIG. 9(e), the pulse P3="0" is resulted at this time.

Therefore, the sequencer 51 increments the value of the select signal SLc in STATUS 5, and shifts to STATUS 1.

Figure 10:
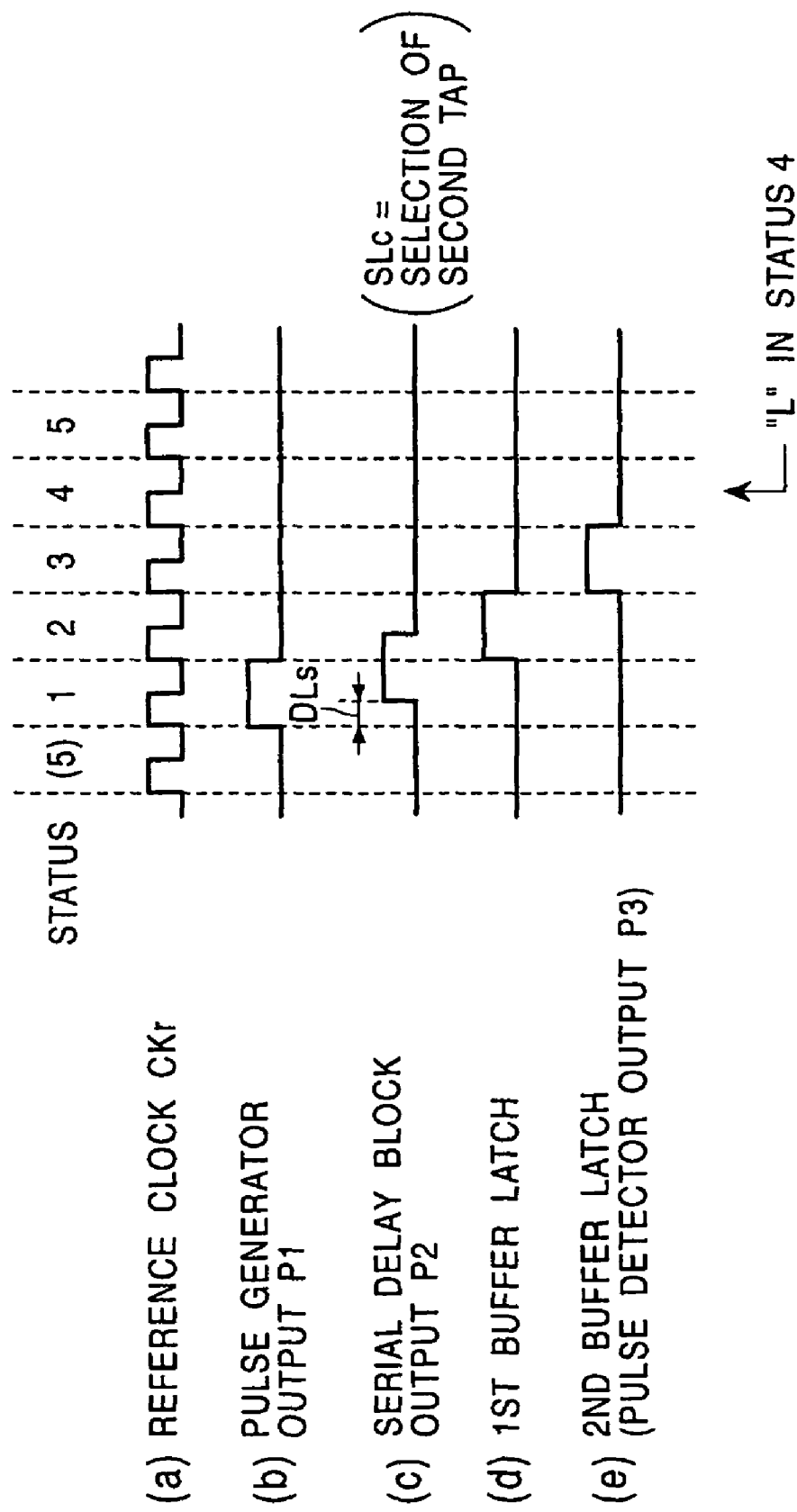
FIGS. 10(a) to 10(e) are timing charts for explaining the measurement processing in the embodiment.

FIG. 10 shows the processing after the shift from STATUS 5 to STATUS 1. Note that STATUS (5) in FIG. 10 represents the preceding STATUS 5 (i.e., STATUS 5 in FIG. 9).

As shown in FIG. 10, the single pulse P1 is outputted from the pulse generator 52 through the processing in STATUS 1 and 2 as shown in FIG. 10(b).

At this time, since the second tap is selected in each of the delay blocks DB1, ..., DBn by the select signal SLc, the pulse P2 obtained through the serially connected delay blocks DB1, ..., DBn has a delay time DLs that is somewhat prolonged, as shown in FIG. 10(c).

The pulse P2 is latched by the flip-flop of the first stage in the pulse detector 53, which outputs a pulse shown in FIG. 10(d). This pulse is then latched by the flip-flop of the latter stage, which outputs the pulse P3 shown in FIG. 10(e) to the sequencer 51.

In the period of STATUS 4, the sequencer 51 determines a value of the pulse P3 shown in FIG. 10(e). The pulse P3="0" is similarly resulted at this time.

Therefore, the sequencer 51 increments the value of the select signal SLc in STATUS 5, and shifts to STATUS 1.

Figure 11:
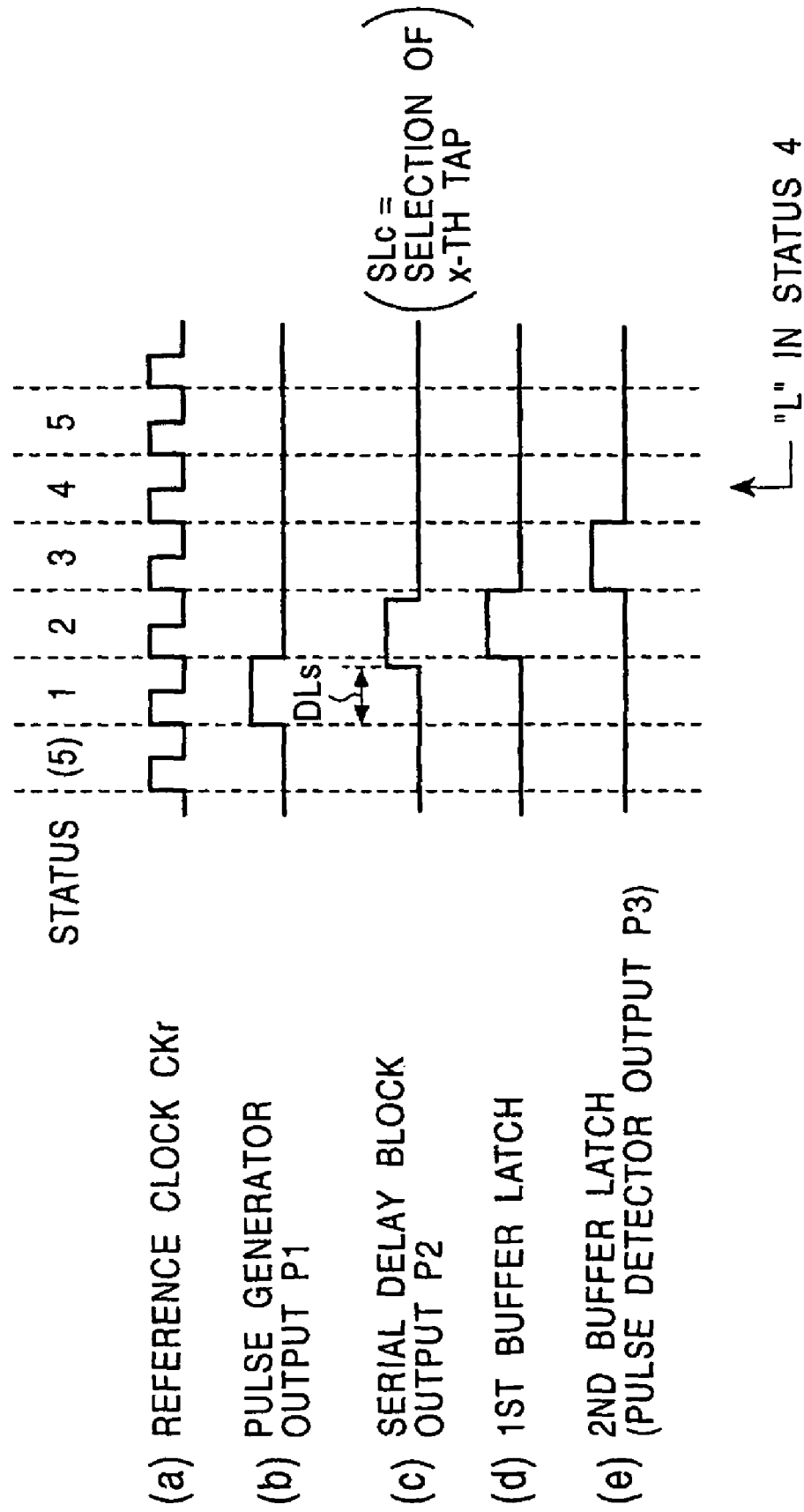
FIGS. 11(a) to 11(e) are timing charts for explaining the measurement processing in the embodiment.

A loop of STATUS 1 to STATUS 5 is repeated in a similar manner. FIG. 11 shows a period subsequent to STATUS 1 in a state where the x-th tap is selected by the select signal SLc. As seen from FIGS. 11(b) and 11(c), the delay time DLs becomes relatively long, but the pulse P3 shown in FIG. 11(e) still remains at in STATUS 4. At this time, therefore, the sequencer 51 likewise increments the value of the select signal SLc in STATUS 5, and shifts to STATUS 1.

Figure 12:
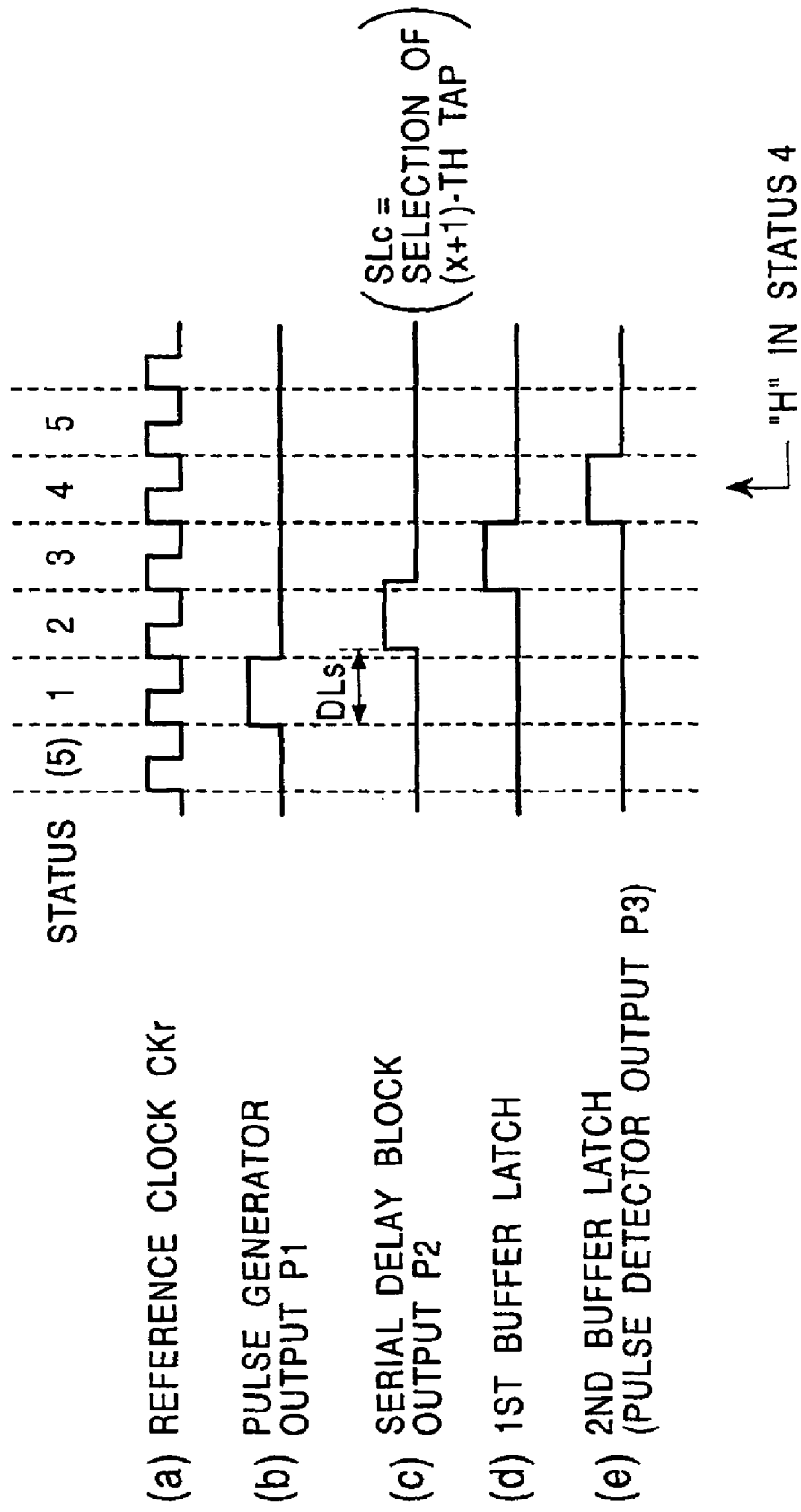
FIGS. 12(a) to 12(e) are timing charts for explaining the measurement processing in the embodiment.

Thereafter, as shown in FIG. 12, the processing subsequent to STATUS 1 is executed in a state where the (x+1)-th tap is selected by the select signal SLc. As seen from FIGS. 12(b) and 12(c), the delay time DLs provided by the delay blocks DB1, ..., DBn is further prolonged. Here, the delay time DLs is longer than the time of one cycle of the clock signal CKr.

At this time, therefore, the pulse P2 is latched by the flip-flop of the first stage in the pulse detector 53, which outputs a pulse shown in FIG. 12(d). This pulse is then latched by the flip-flop of the latter stage, which outputs the pulse P3 shown in FIG. 12(e) to the sequencer 51.

In the period of STATUS 4, the sequencer 51 determines a value of the pulse P3 shown in FIG. 12(e) and detects a state of the pulse P3="0" at this time.

Accordingly, the processing goes to STATUS 6 where a value of the select signal SLc at that time, i.e., a value corresponding to the (x+1)-th tap is stored in the register A, thereby ending the measurement processing.

Although the taps of the delay blocks DB1, ..., DBn are changed in direction from the first tap toward the maximum tap in the above-described processing, it is a matter of course that the sequence may be modified so as to perform the measurement while changing the taps in direction from the maximum tap toward the first tap.

Through the measurement processing described above, the number of taps providing a delay time, which substantially corresponds to one cycle of the reference clock CKr, is determined as a value to be stored in the register A.

By reflecting the thus-determined number of taps in the information that has been measured and stored beforehand in the manufacturing process of a disk drive, it is possible to know a delay time per tap of the delay blocks DB1, ..., DBn or the number of taps corresponding to a delay of 1 nsec at the current situations, i.e., at the time of the measurement processing.

The information prepared beforehand in the disk drive is described below.

To measure a change amount per tap of the delay block, the number of taps is varied one by one while inputting the EFM signal to the delay block, and the change amount of a delay time at that time is measured using an oscilloscope. With this measurement, a measured value of the delay time corresponding to the selected value and an actual value of the delay time per tap of the delay block can be correlated with each other.

Such a measurement is performed taking into account variations in ambient temperature, source voltage, lot-dependent characteristics, etc. in a similar manner, thereby determining the correlation between a measured value of the delay time corresponding to the selected value and an actual value of the delay time per tap of the delay block under the various conditions.

Table data can be thus prepared which represents the correlation between the measured value obtained through the above-described measurement processing and the actual delay value per tap of the delay block.

Then, the delay time per stage of the delay block is determined based on a result of the measurement processing made at a certain point in time and the correlation table prepared beforehand.

Assuming that the delay time per stage is, e.g., 0.25 nsec, it is confirmed that a delay time of 1 nsec can be provided by four stages.

The system controller 10 stores the thus-obtained value in the measurement result register 33-R of the matrix register 33.

In this case, therefore, delay times of 0, 1, 2, 3, 4, 5 and 6 nsec at intervals of 1 nsec can be provided by changing the selected tap of each of the delay blocks DB1, ..., DBn in the order of 0, 4, 8, 12, 16, 20 and 24, respectively.

As a manner of course, a delay time other than values in units of 1 nsec can also be obtained. In this case, for example, a delay time of 1.25 nsec is provided by selecting the fifth tap (tap number=5).

In the disk drive of this embodiment, as described above, the matrix register set the select signal SL1, ..., SLn based on the measurement result of delay characteristics of the delay blocks DB1, ..., DBn. Therefore, delay time control can be precisely performed in units of, e.g., 1 nsec in match with the status (delay time) of the delay blocks DB1., DBn at the current situations.

The above-described measurement processing and update of the value stored in the measurement result register 33-R based on a measurement result are performed at appropriate points in time such as upon loading of a disk, upon power-on, or at intervals of a predetermined time. This enables a proper delay time to be always provided by each of the delay blocks DB1 . . . , DBn regardless of fluctuations in delay characteristics due to changes in temperature environment and so on. As a result, the waveform adjustment of the EFM signal in the direction of the time base can be always executed with high accuracy.

Figure 13:
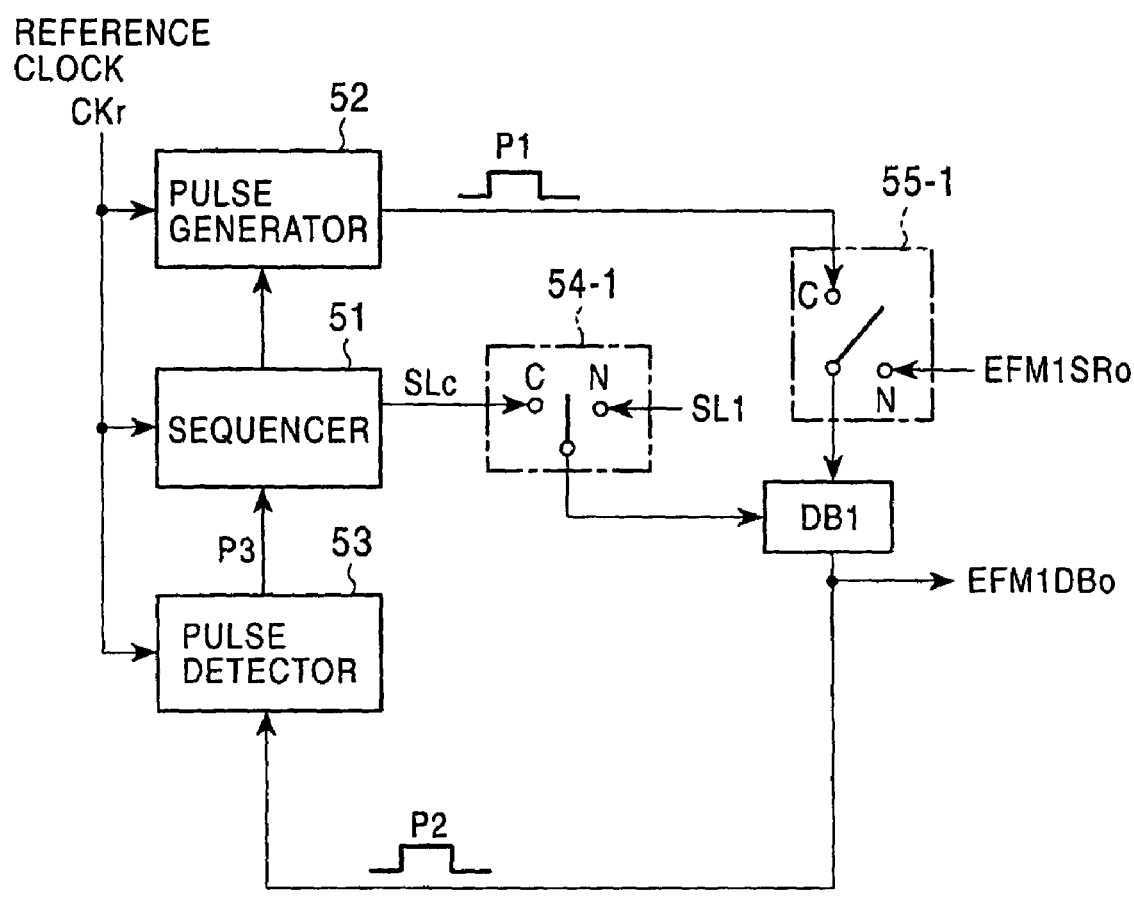
FIG. 13 is a block diagram of another example of the measuring circuit in the embodiment.

FIG. 13 shows another example of the configuration of the measuring circuit 37. In this example, characteristics of the delay block is measured using only one DB1 among the delay blocks DB1 . . . , DBn. While the delay block DB1 is used in this example, any other delay block (such as DB2) may also be used for the measurement.

A detailed description is omitted because the measuring circuit 37 of this example has the same configuration and operates in the same manner as that shown in FIG. 7 except for that only the delay block DB1 is used instead of the delay blocks DB1 . . . , DBn being connected in series, and therefore only the switch 54-1 is used instead of the switches 54-1, . . . , 54-n and only the switch 55-1 is used instead of the switches 55-1, . . . , 55-n.

The measuring circuit 37 shown in FIG. 13 represents an example adaptable for the case where the width (duration) of the single pulse P1 is sufficiently smaller than (usually not larger than a half) the delay time provided by the delay blocks DB when the maximum number of taps is selected.

Stated otherwise, the measuring circuit 37 shown in FIG. 13 is adaptable when the frequency of the reference clock CKr is so high that the cycle of the reference clock CKr is sufficiently smaller than the delay time provided by the delay blocks DB at the maximum number of taps.

On the other hand, when such a condition is not satisfied, it is preferable to employ the configuration shown in FIG. 7 wherein the delay blocks DB1, . . . , DBn are connected in series so that the width of the pulse P1 is relatively reduced and becomes sufficiently smaller than the maximum delay time of the delay blocks.

While the present invention has been described above in connection with one preferred embodiment, the configuration of the disk drive, the configuration of the write strategy unit 21, the clock frequency, the waveform of the laser drive pulse, the configuration of the measuring circuit 37, the method of measurement processing, etc. are not limited to the examples described above, but may be modified in various ways.

Figure 14:
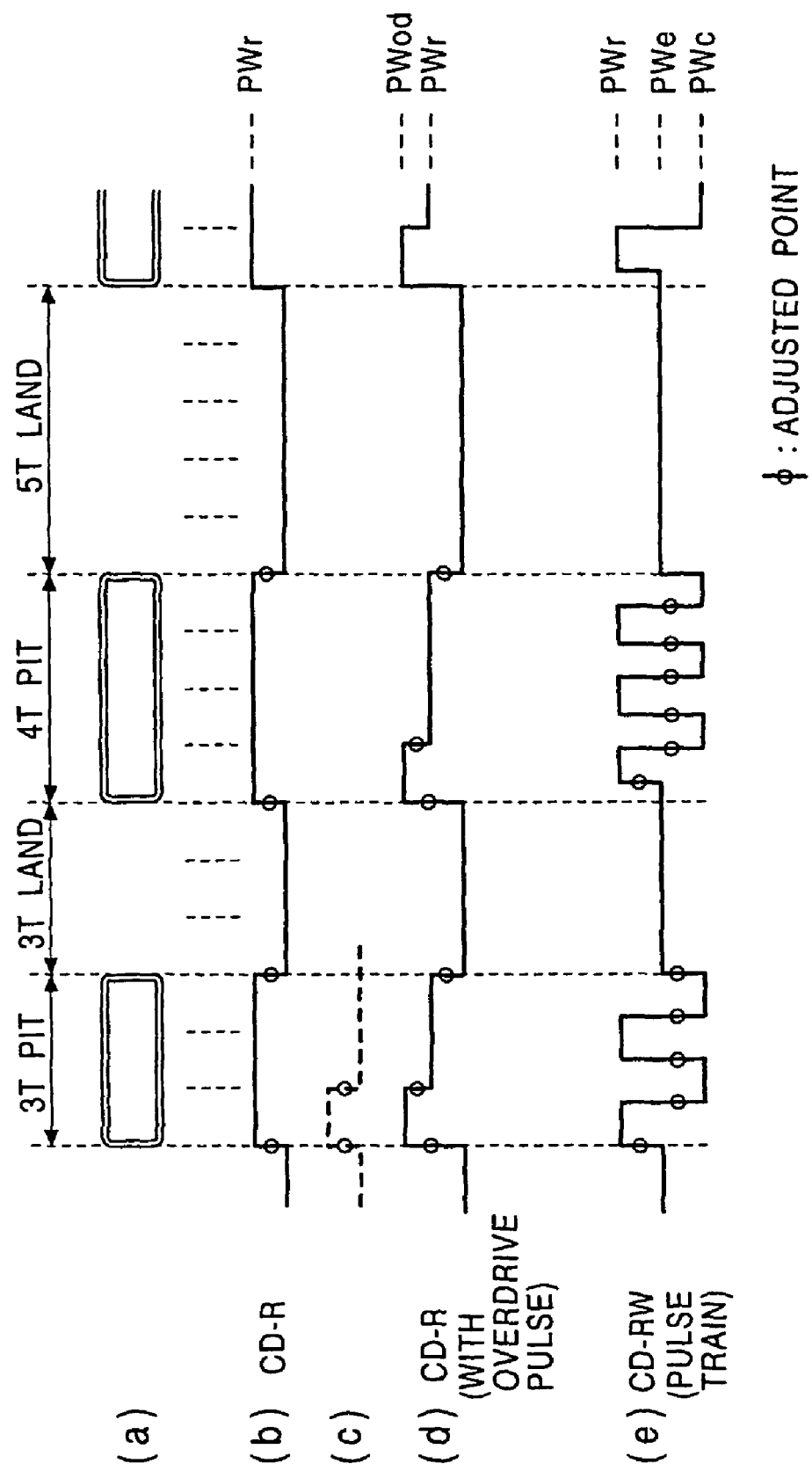
FIGS. 14(a) to 14(e) are timing charts for explaining laser drive pulses.
Figure 15:
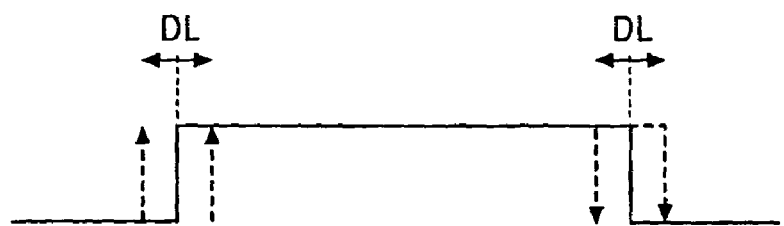
FIG. 15 is a representation for explaining control of a laser drive pulse in the direction of the time base.
Figure 16:
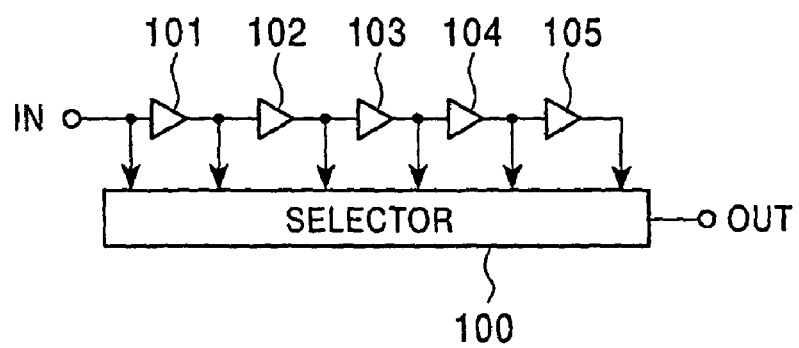
FIG. 16 is a block diagram of a delay circuit in the form of a delay line.
Figure 17:
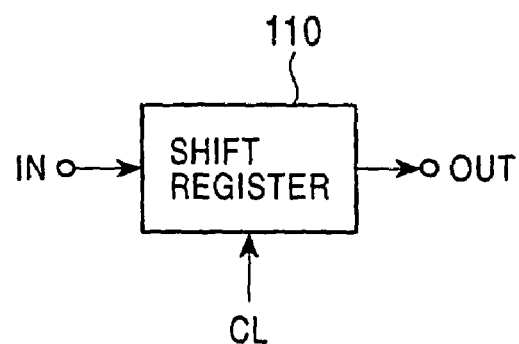
FIG. 17 is a block diagram of a delay circuit using a PLL clock.

The present invention is applicable to not only the laser drive pulses having the waveforms shown in FIGS. 14(*b*), 14(*d*) and 14(*e*), but also pulses having other waveforms.

Further, in addition to devices for writing data in disks such as CD-R and CD-RW, the present invention can also be applied to devices for writing data in other types of disks called DVD-R, DVD-RAM, DVD+RW and DVD-RW. The present invention is particularly suitable for use in a writing system with high-density and high-rate writing capability.

What is claimed is:

1. A writing device comprising:
    laser means for irradiating a beam of laser light with a laser drive pulse supplied to said laser means and forming, on a recording medium, a train of record data in the form of pits and lands between the pits;
    laser drive pulse generating means for generating a laser drive pulse corresponding to the record data; and
    waveform adjusting means including a first delay circuit for delaying the laser drive pulse using a high-frequency clock in sync with the laser drive pulse to provide a delay time in units of said high-frequency clock, a second delay circuit for delaying the laser drive pulse using multistage delay gates to provide a delay time shorter than the delay time provided by said first delay circuit, and a delay time control unit for variably controlling the delay time of said first delay circuit and the delay time of said second delay circuit, said waveform adjusting means delaying the whole or part of a waveform of the laser drive pulse generated by said laser drive pulse generating means and supplying, to said laser means, the laser drive pulse having been adjusted in the direction of the time base.

2. A writing device according to claim 1, wherein said delay time control unit of said waveform adjusting means sets the delay time of said first delay circuit and the delay time of said second delay circuit depending on a length of a pit going to be recorded on said recording medium and a length of a land just before said pit.

3. A writing device according to claim 1, wherein said waveform adjusting means includes a plurality of delay sections each comprising said first delay circuit and said second delay circuit, and
    a plurality of pulses are created from the laser drive pulse generated by said laser drive pulse generating means and are supplied to said delay sections, respectively, and outputs from said delay sections are synthesized to form a laser drive pulse supplied to said laser means.

4. A writing device according to claim 1, wherein said first delay circuit and said second delay circuit are situated in one IC chip.

5. A writing device according to claim 1, further comprising measuring means for measuring characteristics of the multistage delay gates in said second delay circuit.

6. A writing device according to claim 5, wherein said delay time control unit controls the delay time of said second delay circuit using information obtained from a measurement result of said measuring means.

7. A writing device according to claim 3, further comprising a register for holding delay amounts, which correspond to delay times set in said plurality of delay sections, depending on lengths of the pits and lands.

8. A method of irradiating a beam of laser light onto a recording medium and forming, on said recording medium, a train of record data in the form of pits and lands, said method comprising the steps of:
    generating a laser drive pulse corresponding to the record data;
    delaying the laser drive pulse using a clock in sync with the laser drive pulse to provided a first delay time in units of said clock;
    delaying the laser drive pulse using multistage delay gates to provide a second delay time shorter than tie first delay time;
    changing the first delay time and the second delay time to adjust the laser drive pulse in the direction of the time base; and
    supplying the adjusted laser drive pulse to a laser.

9. A method according to claim 8, further comprising the steps of:
    dividing the generated laser drive pulse into a plurality of pulses; and
    synthesizing said plurality of pulses having been delayed through the first delay time and the second delay time.

* * * * *